US012296721B2

(12) United States Patent
Cronin

(10) Patent No.: US 12,296,721 B2
(45) Date of Patent: May 13, 2025

(54) METHOD AND SYSTEMS TO TRICKLE CHARGE ELECTRIC VEHICLE'S SUPERCAPACITORS USING SOLAR ENERGY

(71) Applicant: SUSTAINABLE ENERGY TECHNOLOGIES, INC., Wilmington, DE (US)

(72) Inventor: John Cronin, Wilmington, DE (US)

(73) Assignee: SUSTAINABLE ENERGY TECHNOLOGIES, INC., Wilmington, DE (US)

(*) Notice: Subject to any disclaimer, the term of this patent is extended or adjusted under 35 U.S.C. 154(b) by 0 days.

(21) Appl. No.: 18/079,841

(22) Filed: Dec. 12, 2022

(65) Prior Publication Data

US 2023/0182580 A1 Jun. 15, 2023

Related U.S. Application Data

(60) Provisional application No. 63/288,327, filed on Dec. 10, 2021.

(51) Int. Cl.
*B60L 8/00* (2006.01)
*B60L 53/00* (2019.01)
(Continued)

(52) U.S. Cl.
CPC .............. *B60L 8/003* (2013.01); *B60L 53/00* (2019.02); *H02J 7/0063* (2013.01);
(Continued)

(58) Field of Classification Search
CPC ...... B60L 8/003; B60L 53/00; H02J 7/00712; H02J 7/0063; H02J 7/345; H02J 7/35
See application file for complete search history.

(56) References Cited

U.S. PATENT DOCUMENTS 6,011,379 A 1/2000 Singh et al.
6,724,102 B1 4/2004 Kelwaski et al.
(Continued)

FOREIGN PATENT DOCUMENTS

CN 104057901 9/2014
CN 106252096 12/2016
(Continued)

OTHER PUBLICATIONS

US 12,187,158 B2, 01/2025, Cronin (withdrawn)
(Continued)

*Primary Examiner* — Jared Fureman
*Assistant Examiner* — Duc M Pham
(74) *Attorney, Agent, or Firm* — Polsinelli LLP

(57) ABSTRACT

Disclosed herein are systems and methods for energy management. A system, such as a vehicle, includes a solar cell that generates energy in response to receiving light. The system includes an energy controller, which includes a processor and memory, that predicts an optimal time period for charging an energy storage unit based on information tracking discharging of the energy storage unit over time. The system includes trickle charging circuitry that provides the energy to the energy storage unit during the optimal time period, and the energy storage unit that stores the energy and discharges the energy to power at least one component, such as a vehicle propulsion mechanism.

20 Claims, 12 Drawing Sheets

(51) Int. Cl.
*H02J 7/00* (2006.01)
*H02J 7/34* (2006.01)
*H02J 7/35* (2006.01)

(52) U.S. Cl.
CPC .......... *H02J 7/00712* (2020.01); *H02J 7/345* (2013.01); *H02J 7/35* (2013.01)

(56) References Cited

U.S. PATENT DOCUMENTS

| | | |
|---|---|---|
| 7,548,894 B2 | 6/2009 | Fuji |
| 8,881,832 B2 | 11/2014 | McMillon et al. |
| 8,950,662 B2 | 2/2015 | Soborski |
| 9,053,870 B2 | 6/2015 | Yu et al. |
| 9,056,556 B1 | 6/2015 | Hyde et al. |
| 9,070,505 B2 | 6/2015 | Saitoh |
| 9,079,505 B1 | 7/2015 | Hyde et al. |
| 9,145,760 B2 | 9/2015 | McMillon et al. |
| 9,169,719 B2 | 10/2015 | McMillon et al. |
| 9,233,860 B2 | 1/2016 | Liu et al. |
| 9,318,271 B2 | 4/2016 | Fletcher et al. |
| 9,379,546 B2 | 6/2016 | Li |
| 9,519,942 B2 | 12/2016 | Soborski |
| 9,940,572 B2 | 4/2018 | Soborski |
| 10,061,958 B2 | 8/2018 | Voigt et al. |
| 10,173,663 B1 | 1/2019 | Combs |
| 10,235,597 B2 | 3/2019 | Voigt et al. |
| 10,380,601 B2 | 8/2019 | Soborski |
| 10,826,304 B1 | 11/2020 | Thomas et al. |
| 12,179,608 B2 | 12/2024 | Cronin |
| 12,194,886 B2 | 1/2025 | Cronin |
| 2004/0036475 A1 | 2/2004 | Pascoe et al. |
| 2005/0057098 A1 | 3/2005 | Bouchon |
| 2006/0132102 A1 | 6/2006 | Harvey |
| 2006/0178170 A1 | 8/2006 | Chung et al. |
| 2006/0284617 A1 | 12/2006 | Kozlowski et al. |
| 2006/0285617 A1 | 12/2006 | Roberts et al. |
| 2007/0080662 A1 | 4/2007 | Wu |
| 2007/0258188 A1 | 11/2007 | Shiue et al. |
| 2008/0276825 A1 | 11/2008 | King et al. |
| 2009/0021871 A1 | 1/2009 | Moran et al. |
| 2010/0060231 A1 | 3/2010 | Trainor et al. |
| 2010/0116574 A1 | 5/2010 | Gilmore |
| 2010/0123436 A1 | 5/2010 | Herrod et al. |
| 2010/0225282 A1 | 9/2010 | Paasch |
| 2010/0305792 A1 | 12/2010 | Wilk et al. |
| 2011/0003188 A1 | 1/2011 | Cheng et al. |
| 2011/0080133 A1 | 4/2011 | Tamburrino et al. |
| 2012/0029724 A1 | 2/2012 | Formanski et al. |
| 2012/0041626 A1 | 2/2012 | Kelty et al. |
| 2012/0049621 A1 | 3/2012 | Shinoda |
| 2012/0062186 A1 | 3/2012 | Dessirier et al. |
| 2012/0136535 A1 | 5/2012 | Buford et al. |
| 2012/0183815 A1 | 7/2012 | Johnston et al. |
| 2012/0187906 A1 | 7/2012 | Martienssen et al. |
| 2012/0293077 A1 | 11/2012 | Tousain et al. |
| 2013/0033203 A1 | 2/2013 | Luke et al. |
| 2013/0162037 A1* | 6/2013 | Kim ............ H02J 3/381 307/24 |
| 2013/0179061 A1 | 7/2013 | Gadh et al. |
| 2013/0181680 A1 | 7/2013 | Chau |
| 2013/0188283 A1 | 7/2013 | Midholm et al. |
| 2014/0129040 A1 | 5/2014 | Emadi et al. |
| 2015/0046012 A1 | 2/2015 | Chen et al. |
| 2015/0047844 A1 | 2/2015 | McMillon et al. |
| 2015/0077054 A1 | 3/2015 | Uyeki |
| 2015/0274030 A1 | 10/2015 | Payne et al. |
| 2015/0275788 A1* | 10/2015 | Dufford ............ B60W 50/0097 701/1 |
| 2016/0079633 A1 | 3/2016 | Wahlstrom et al. |
| 2016/0167677 A1 | 6/2016 | Schaefer et al. |
| 2016/0176298 A1 | 6/2016 | Watson et al. |
| 2016/0283842 A1 | 9/2016 | Pescianschi |
| 2016/0288666 A1 | 10/2016 | Kim et al. |
| 2016/0297316 A1 | 10/2016 | Penilla et al. |
| 2016/0301246 A1 | 10/2016 | Sato |
| 2016/0349330 A1 | 12/2016 | Barfield, Jr. et al. |
| 2016/0365833 A1 | 12/2016 | Saby et al. |
| 2016/0375780 A1 | 12/2016 | Penilla et al. |
| 2016/0375786 A1 | 12/2016 | Liu |
| 2016/0380455 A1 | 12/2016 | Greening et al. |
| 2017/0001585 A1 | 1/2017 | Fink |
| 2017/0053459 A9 | 2/2017 | Luke |
| 2017/0109467 A1* | 4/2017 | Shimizu ........... G06Q 50/06 |
| 2017/0234251 A1 | 8/2017 | Commenda et al. |
| 2018/0074132 A1 | 3/2018 | Day et al. |
| 2018/0134171 A1 | 5/2018 | Hyde et al. |
| 2018/0137991 A1 | 5/2018 | Roumi et al. |
| 2018/0154779 A1 | 6/2018 | Chol et al. |
| 2018/0236887 A1 | 8/2018 | Sarkar et al. |
| 2018/0283887 A1 | 10/2018 | Dudar et al. |
| 2019/0031125 A1 | 1/2019 | Rozman et al. |
| 2019/0061541 A1 | 2/2019 | Penilla et al. |
| 2019/0094383 A1 | 3/2019 | Annapureddy et al. |
| 2019/0097362 A1 | 3/2019 | Haba et al. |
| 2019/0107406 A1 | 4/2019 | Cox et al. |
| 2019/0180949 A1 | 6/2019 | Liu et al. |
| 2019/0196851 A1 | 6/2019 | Penilla et al. |
| 2019/0283600 A1 | 9/2019 | Koebler et al. |
| 2020/0079223 A1 | 3/2020 | Puri et al. |
| 2020/0094810 A1 | 3/2020 | Moreland |
| 2020/0247239 A1 | 8/2020 | Stoltz |
| 2020/0295412 A1 | 9/2020 | Chen |
| 2020/0328622 A1 | 10/2020 | Abu Qahouq |
| 2020/0365336 A1 | 11/2020 | Luo et al. |
| 2021/0005939 A1 | 1/2021 | Tajima et al. |
| 2021/0083345 A1 | 3/2021 | Ciaccio et al. |
| 2021/0088591 A1 | 3/2021 | Naha et al. |
| 2021/0123975 A1 | 4/2021 | Sarwat et al. |
| 2021/0138927 A1 | 5/2021 | Maeng et al. |
| 2021/0190868 A1 | 6/2021 | Benoit et al. |
| 2021/0202989 A1 | 7/2021 | Lee et al. |
| 2021/0237578 A1 | 8/2021 | Ing |
| 2021/0284043 A1 | 9/2021 | Wang et al. |
| 2023/0136195 A1 | 5/2023 | Cronin |
| 2023/0139003 A1 | 5/2023 | Bhasme et al. |
| 2023/0170732 A1 | 6/2023 | Cronin |
| 2023/0173923 A1 | 6/2023 | Cronin |
| 2023/0173936 A1 | 6/2023 | Cronin |
| 2023/0173949 A1 | 6/2023 | Cronin |
| 2023/0174041 A1 | 6/2023 | Cronin |
| 2023/0176635 A1 | 6/2023 | Cronin |
| 2023/0182616 A1 | 6/2023 | Cronin |
| 2023/0182617 A1 | 6/2023 | Cronin |
| 2023/0182621 A1 | 6/2023 | Cronin |
| 2023/0187960 A1 | 6/2023 | Cronin |
| 2023/0192063 A1 | 6/2023 | Cronin |
| 2023/0211667 A1 | 7/2023 | Cronin |
| 2023/0216317 A1 | 7/2023 | Cronin |
| 2023/0223784 A1 | 7/2023 | Cronin |
| 2023/0326268 A1 | 10/2023 | Cronin |
| 2024/0181927 A1 | 6/2024 | Cronin |

FOREIGN PATENT DOCUMENTS

| | | |
|---|---|---|
| CN | 106252099 | 12/2016 |
| CN | 109888904 | 10/2020 |
| EP | 2 278 677 | 1/2011 |
| WO | WO 2014/107151 | 7/2014 |
| WO | WO 2014/165197 | 10/2014 |
| WO | WO 2015/016965 | 2/2015 |
| WO | WO 2018/231932 | 12/2016 |
| WO | WO 2018/041095 | 3/2018 |
| WO | WO 2018/106799 | 6/2018 |
| WO | WO 2019/224527 | 11/2019 |
| WO | WO 2020/240148 | 12/2020 |
| WO | WO 2021/122753 | 6/2021 |
| WO | WO 2023/076632 | 5/2023 |
| WO | WO 2023/102265 | 6/2023 |
| WO | WO 2023/102266 | 6/2023 |
| WO | WO 2023/102267 | 6/2023 |
| WO | WO 2023/102269 | 6/2023 |
| WO | WO 2023/102274 | 6/2023 |
| WO | WO 2023/107502 | 6/2023 |

(56) References Cited

FOREIGN PATENT DOCUMENTS

| WO | WO 2023/107503 | 6/2023 |
|---|---|---|
| WO | WO 2023/107504 | 6/2023 |
| WO | WO 2023/107505 | 6/2023 |
| WO | WO 2023/107513 | 6/2023 |
| WO | WO 2023/107514 | 6/2023 |
| WO | WO 2023/107752 | 6/2023 |
| WO | WO 2023/114326 | 6/2023 |
| WO | WO 2023/129639 | 7/2023 |
| WO | WO 2023/129707 | 7/2023 |
| WO | WO 2023/129739 | 7/2023 |
| WO | WO 2023/215003 | 11/2023 |

OTHER PUBLICATIONS

"200-MHz 16 x 16 Video Crosspoint Switch IC," Analogue Dialogue, Apr. 1997, vol. 31, No. 2, 25 pages; https://www.analog.com/en/analog-dialogue/articles/200-mhz-16x16-video-crosspoint-switch-ic.html.
"8x8 Analog Crosspoint Switches Analog & Digital Crosspoint ICs," Mouser Electronics, [Downloaded on Internet: Feb. 21, 2023], 5 pages, https://www.mouser.com/c/semiconductors/communication-networking-ics/analog-digital-crosspoint-ics.
Camara et al., "Polynomial Control Method of DC/DC Converters for DC-Bus Voltage and Currents Management—Battery and Supercapacitors," IEEE Transaction on Power Electronics, vol. 27, No. 3 (Mar. 2012): 1455-1467, DOI: 10.1109/TPEL.2011.2164581.
Crossbar Switch—Wikipedia, [Downloaded from Internet: Feb. 21, 2023], 7 pages; https://en.wikipedia.org/wiki/Crossbar_switch.
Danila et al., Elena; "Dynamic Modelling of Supercapacitor Using Artificial Neural Network Technique," International Conference and Exposition on Electrical and Power Engineering, Oct. 2014, DOI: 10.1109/ICEPE.2014.6969988 and https://www.researchgate.net/publication/270888480_Dynamic_Modelling_of_Supercapacitor_Using_Artificial_Neural_Network_Technique.
"Details, datasheet, quote on part No. BQ24640RVAR—High Efficienty Synchronous Switch-Mode Battery Charge Controller for Super Capacitors," Texas Instruments, SLUSA44A—Mar. 2010—Revised Jul. 2015, 31 pages, https://www.digchip.com/datasheets/%203258066-bq24640rvar.html.
"Digital Crosspoint Switches," MicroSemi Corp. (Aliso Viego, CA), [Downloadaed from Internet Feb. 21, 2023], 2 pages, https://www.microsemi.com/product-directory/signal-integrity/3579-digital-crosspoint-switches.
Eddahech et al., Akram; "Modeling and adaptive control for supercapacitor in automotive applications based on artificial neural networks," Electric Power Systems Research, vol. 106 (Jan. 2014): 134-141, https://www.sciencedirect.com/science/article/abs/pii/S0378779613002265.
Ge et al., Yuru; "How to measure and report the capacity of electrochemical double layers, supercapacitors, and their electrode materials," Journal of Solid State Electrochemistry, vol. 24 (2020): 3215-3230, https://link.springer.com/article/10.1007/s10008-020-04804-x.
Haddoun, Abdelhakim; "Modeling, Analysis, and Neural Network Control of an EV Electrical Differential," IEEE Transactions on Industrial Electronics, vol. 55, No. 6 (Jun. 2008): 2286-94, https://www.researchgate.net/publication/3219993.
Lin et al., Tianquan; "Nitrogen-doped mesoporous carbon of extraordinary capacitance for electrochemicalenergy storage," Science (new series), vol. 350, No. 6267 (Dec. 18, 2015): 1508-1513https://www.jstor.org/stable/24741499.
Marie-Francoise et al., Jean-Noel; "Supercapacitor modeling with Artificial Neural Network (ANN)," 2004, https://www.osti.gov/etdeweb/servlets/purl/20823689.
"Micrel™ 2.5V/3.3V 3.0 GHz Dual 2x2 CML Crosspoint Switch w/ Internal Termination, SuperLite™ SY55858U," Nov. 2005, 8 pages, http://ww1.microchip.com/downloads/en/DeviceDoc/sy55858u.pdf.
Surewaard et al., Erik; "A Comparison of Different Methods for Battery and Supercapacitor Modeling," SAE Transactions, Journal of Engines, vol. 112, Section 3 (2003): 1851-1859, https://www.jstor.org/stable/44741399.
"Testing Super-Capacitors, Part 1: CV, EIS, and Leakage Current," Apr. 16, 2015, 11 pages, https://www.gamry.com/assets/Uploads/Super-capacitors-part-1-rev-2.pdf.
"Testing Electrochemical Capacitors Part 2—Cyclic Charge Discharge and Stacsk," Nov. 14, 2011, 11 pages; https://www.gamry.com/assets/Application-Notes/Testing-Super-Capacitors-Pt2.pdf.
"Understanding Tree and Crosspoint Matrix Architectures." Pickering Test, [Downloaded from Internet: Feb. 21, 2023], 7 pages, https://www.pickeringtest.com/en-us/kb/hardware-topics/switching-architectures/understanding-tree-and-crosspoint-matrix-architectures.
PCT Application No. PCT/US2022/052054, International Search Report and Written Opinion dated Feb. 5, 2024.
Kokate et al., "Retrofitting of Auto Rickshaw to E-Rickshaw—A Feasibility Study", 2020 First International Conference on Power, Control and Computing Technologies (ICPC2T), IEEE, URL: https://ieeexplore.ieee.org/stamp/stamp.jsp?tp=&amumber=9071492> entire document.
U.S. Appl. No. 17/976,674, John Cronin, A Modular Power Pack Energy Storage Unit, filed Oct. 28, 2022.
PCT/US22/048287, A modular power pack energy storage unit, Oct. 28, 2022.
U.S. Appl. No. 18/075,333, John Cronin, Modular Multi-Type Power Pack Charging Apparatus, filed Dec. 5, 2022.
PCT/US22/51865, Modular Multi-Type Power Pack Charging Apparatus, Dec. 5, 2022.
U.S. Appl. No. 18/075,299, John Cronin, System and Method for Energy Management of a Power Pack For an Electric Vehicle Including Photovoltaic Charging, filed Dec. 5, 2022.
PCT/US22/51863, System and Method for Energy Management of a Power Pack for an Electric Vehicle Including Photovoltaic Charging, Dec. 5, 2022.
U.S. Appl. No. 18/075,338, John Cronin, Integrated Power System and Method for Energy Management for Electric Vehicle, filed Dec. 5, 2022.
PCT/US22/51867, Integrated Power System and Method for Energy Management for Electric Vehicle, Dec. 5, 2022.
U.S. Appl. No. 18/075,358, John Cronin, Monitoring and Managing Temperature of Power Packs, filed Dec. 5, 2022.
PCT/US22/51870, Monitoring and Managing Temperature of Power Packs, Dec. 5, 2022.
U.S. Appl. No. 18/075,102, John Cronin, Modular Power Pack Energy Storage Unit, filed Dec. 5, 2022.
PCT/US22/51881, Modular Power Pack Energy Storage Unit, Dec. 5, 2022.
U.S. Appl. No. 18/076,248, John Cronin, Charge Compatible Supercapacitor System, filed Dec. 6, 2022.
PCT/US22/52033, Charge Compatible Supercapacitor System, Dec. 6, 2022.
U.S. Appl. No. 18/076,255, John Cronin, Evaluating and Managing Supercapacitors of Electric Vehicles, filed Dec. 6, 2022.
PCT/US22/52034, Evaluating and Managing Supercapacitors of Electric Vehicles, Dec. 6, 2022.
U.S. Appl. No. 18/076,283, John Cronin, Electric Vehicle Supercapacitor Thermal Management, filed Dec. 6, 2022.
PCT/US22/52045, Electric Vehicle Supercapacitor Thermal Management, Dec. 6, 2022.
U.S. Appl. No. 18/076,358, John Cronin, Charging Electric Vehicle Supercapacitors Using Solar Energy, filed Dec. 6, 2022.
PCT/US22/52054, Charging Electric Vehicle Supercapacitors Using Solar Energy, Dec. 6, 2022.
U.S. Appl. No. 18/076,259, John Cronin, System and Method for Determining Range and Capacity of Supercapacitor Battery Storage for Electric Vehicle, filed Dec. 6, 2022.
PCT/US22/52035, System and Method for Determining Range and Capacity of Supercapacitor Battery Storage for Electric Vehicle, Dec. 6, 2022.

(56) References Cited

OTHER PUBLICATIONS

U.S. Appl. No. 18/076,266, John Cronin, System and Method for User-Defined Electric Vehicle Supercapacitor Batteries, filed Dec. 6, 2022.
PCT/US22/52036, System and Method for User-Defined Electric Vehicle Supercapacitor Batteries, filed Dec. 6, 2022.
U.S. Appl. No. 18/076,321, John Cronin, System and Method for Analyzing Temperature Changes in Supercapacitor Battery Storage for Electric Vehicle, filed Dec. 6, 2022.
PCT/US22/52049, System and Method for Analyzing Temperature Changes in Supercapacitor Battery Storage for Electric Vehicle, Dec. 6, 2022.
PCT/US22/52602, Method and Systems to Trickle Charge Electric Vehicle's Supercapacitors Using Solar Energy, Dec. 12, 2022.
U.S. Appl. No. 18/081,508, John Cronin, Retrofitting an Electric Vehicle With a Intelligent Supercapacitor Battery Unit, filed Dec. 14, 2022.
PCT/US22/52890, Retrofitting an Electric Vehicle With a Intelligent Supercapacitor Battery Unit, Dec. 14, 2022.
U.S. Appl. No. 18/092,028, John Cronin, Supercapacitor System With a on Board Computing and Charging Capability, filed Dec. 30, 2022.
PCT/US22/54386, Supercapacitor System With a on Board Computing and Charging Capability, Dec. 30, 2022.
U.S. Appl. No. 18/090,695, John Cronin, Supercapacitor System With an Over Voltage Protection Capability, filed Dec. 29, 2022.
PCT/US22/54226, Supercapacitor System With an Over Voltage Protection Capability, Dec. 28, 2022.
U.S. Appl. No. 18/091,369, John Cronin, Supercapacitor System With Temperature Control, filed Dec. 30, 2022.
PCT/US22/54334, Supercapacitor System With Temperature Control, Dec. 30, 2022.
PCT Application No. PCT/US22/51881 Invitation to Pay Additional Fees dated Mar. 2, 2023.
PCT Application No. PCT/US2022/051867 International Search Report and Written Opinion dated Mar. 7, 2023.
PCT Application No. PCT/US22/52033 International Search Report and Written Opinion dated Mar. 8, 2023.
PCT Application No. PCT/US22/52049 International Search Report and Written Opinion dated Mar. 8, 2023.
PCT Application No. PCT/US2022/048287 International Search Report and Written Opinion dated Mar. 10, 2023.
PCT Application No. PCT/US22/52035 International Search Report and Written Opinion dated Mar. 14, 2023.
PCT Application No. PCT/US2022/051863 International Search Report and Written Opinion dated Mar. 17, 2023.
PCT Application No. PCT/US22/52034 International Search Report and Written Opinion dated Mar. 20, 2023.
PCT Application No. PCT/US22/52890 International Search Report and Written Opinion dated Mar. 20, 2023.
PCT Application No. PCT/US22/52045 International Search Report and Written Opinion dated Mar. 21, 2023.
PCT Application No. PCT/US22/52036 International Search Report and Written Opinion dated Mar. 30, 2023.
PCT Application No. PCT/US22/52602 International Search Report and Written Opinion dated Apr. 4, 2023.
PCT Application No. PCT/US22/51870 International Search Report and Written Opinion dated Apr. 5, 2023.
PCT Application No. PCT/US22/54334 International Search Report and Written Opinion dated Apr. 5, 2023.
PCT Application No. PCT/US22/54386 International Search Report and Written Opinion dated Apr. 12, 2023.
PCT Application No. PCT/US22/54226 International Search Report and Written Opinion dated Apr. 18, 2023.
PCT Application No. PCT/US2022/051865 International Search Report and Written Opinion dated May 2, 2023.
Sarwar et al. "Experimental analysis of Hybridised Energy Storage Systems for automotive applications." Journal of Power Sources 324 (2016): 388-401. Aug. 30, 2016 (Aug. 30, 2016) Retrieved on Feb. 11, 2023 (Feb. 11, 2023) from <https://www.sciencedirect.com/science/article/abs/pii/S0378775316306784>.
PCT Application No. PCT/US2022/048287, International Preliminary Report on Patentability dated May 10, 2024.
PCT Application No. PCT/US2022/051865, International Preliminary Report on Patentability dated Jun. 13, 2024.
PCT Application No. PCT/US2022/051863, International Preliminary Report on Patentability dated Jun. 13, 2024.
PCT Application No. PCT/US2022/051867, International Preliminary Report on Patentability dated Jun. 13, 2024.
PCT Application No. PCT/US2022/51870, International Preliminary Report on Patentability dated Jun. 13, 2024.
PCT Application No. PCT/US2022/051881, International Search Report and Written Opinion dated May 26, 2023.
PCT Application No. PCT/US2022/051881, International Preliminary Report on Patentability dated Jun. 13, 2024.
PCT Application No. PCT/US2022052033, International Preliminary Report on Patentability dated Jun. 20, 2024.
PCT Application No. PCT/US2022/052034, International Preliminary Report on Patentability dated Jun. 20, 2024.
PCT Application No. PCT/US2022/052045, International Preliminary Report on Patentability dated Jun. 20, 2024.
PCT Application No. PCT/US2022/052054, International Preliminary Report on Patentability dated Jun. 20, 2024.
PCT Application No. PCT/US2022/052035, International Preliminary Report on Patentability dated Jun. 20, 2024.
PCT Application No. PCT/US2022/052036, International Preliminary Report on Patentability dated Jun. 20, 2024.
PCT Application No. PCT/US2022/052049. International Preliminary Report on Patentability dated Jun. 20, 2024.
PCT Application No. PCT/US2022/052602, International Preliminary Report on Patentability dated Jun. 20, 2024.
PCT Application No. PCT/US2022/052890, International Preliminary Report on Patentability dated Jun. 27, 2024.
PCT Application No. PCT/US2022/054386, International Preliminary Report on Patentability dated Jul. 11, 2024.
PCT Application No. PCT/US2022/054226, International Preliminary Report on Patentability dated Jul. 11, 2024.
PCT Application No. PCT/US2022/054334, International Preliminary Report on Patentability dated Jul. 11, 2024.
U.S. Appl. No. 18/075,333, Office Action dated Sep. 25, 2024.
U.S. Appl. No. 18/076,259, Office Action dated Sep. 13, 2024.
U.S. Appl. No. 18/081,508, Office Action dated Apr. 9, 2024.
Tesla, Model S Owner's Manual, May 16, 2019.
U.S. Appl. No. 18/075,338, Final Office Action dated Feb. 27, 2025.
U.S. Appl. No. 18/076,255, Office Action dated Feb. 26, 2025.

* cited by examiner

METHOD AND SYSTEMS TO TRICKLE CHARGE ELECTRIC VEHICLE'S SUPERCAPACITORS USING SOLAR ENERGY

CROSS-REFERENCE TO RELATED APPLICATIONS

This application claims the benefit of U.S. Provisional Application No. 63/288,327, filed Dec. 10, 2021, for "METHOD AND SYSTEMS TO TRICKLE CHARGE ELECTRIC VEHICLES SUPERCAPACITORS USING SOLAR ENERGY," the disclosure of which is incorporated herein by reference in its entirety.

FIELD OF THE DISCLOSURE

The present disclosure is generally related to prediction of optimal charging time(s) for charging an energy storage unit of a vehicle based on charging and/or discharging data.

BACKGROUND

Some vehicles, such as electric vehicles or hybrid vehicles, include energy storage units such as batteries to power components and subsystems of the vehicles. For instance, in some vehicles, power from the energy storage units is used to power propulsion mechanisms, such as motors and/or engines, that propel the vehicle. Such a vehicle's effective driving range can be limited by how much power can be provided by its energy storage units. A supercapacitor is a type of capacitor that can be used as an energy storage unit.

SUMMARY

Disclosed herein are systems and methods for energy management. A system, such as a vehicle, includes a solar cell that generates energy in response to receiving light. The system includes an energy controller, which includes a processor and memory, that predicts an optimal time period for charging an energy storage unit based on information tracking discharging of the energy storage unit over time. The system includes trickle charging circuitry that provides the energy to the energy storage unit during the optimal time period, and the energy storage unit that stores the energy and discharges the energy to power at least one component, such as a vehicle propulsion mechanism.

In an illustrative example, a system is disclosed for energy management. The system comprises: a solar cell configured to generate energy in response to receiving light; an energy controller that that includes a processor with access to a memory, wherein the energy controller is configured to predict an optimal time period for charging an energy storage unit based on information tracking discharging of the energy storage unit over time; trickle charging circuitry configured to provide the energy to the energy storage unit during the optimal time period; and the energy storage unit configured to store the energy and configured to discharge the energy to power at least one component.

In another illustrative example, a method is disclosed for energy management. The method comprises: generating energy using a solar cell in response to receiving light; predicting an optimal time period for charging an energy storage unit based on information tracking discharging of the energy storage unit over time; providing the energy to the energy storage unit during the optimal time period; storing the energy in the energy storage unit; and discharging the energy from the energy storage unit to power at least one component.

BRIEF DESCRIPTIONS OF THE DRAWINGS

The accompanying drawings illustrate various embodiments of systems, methods, and other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
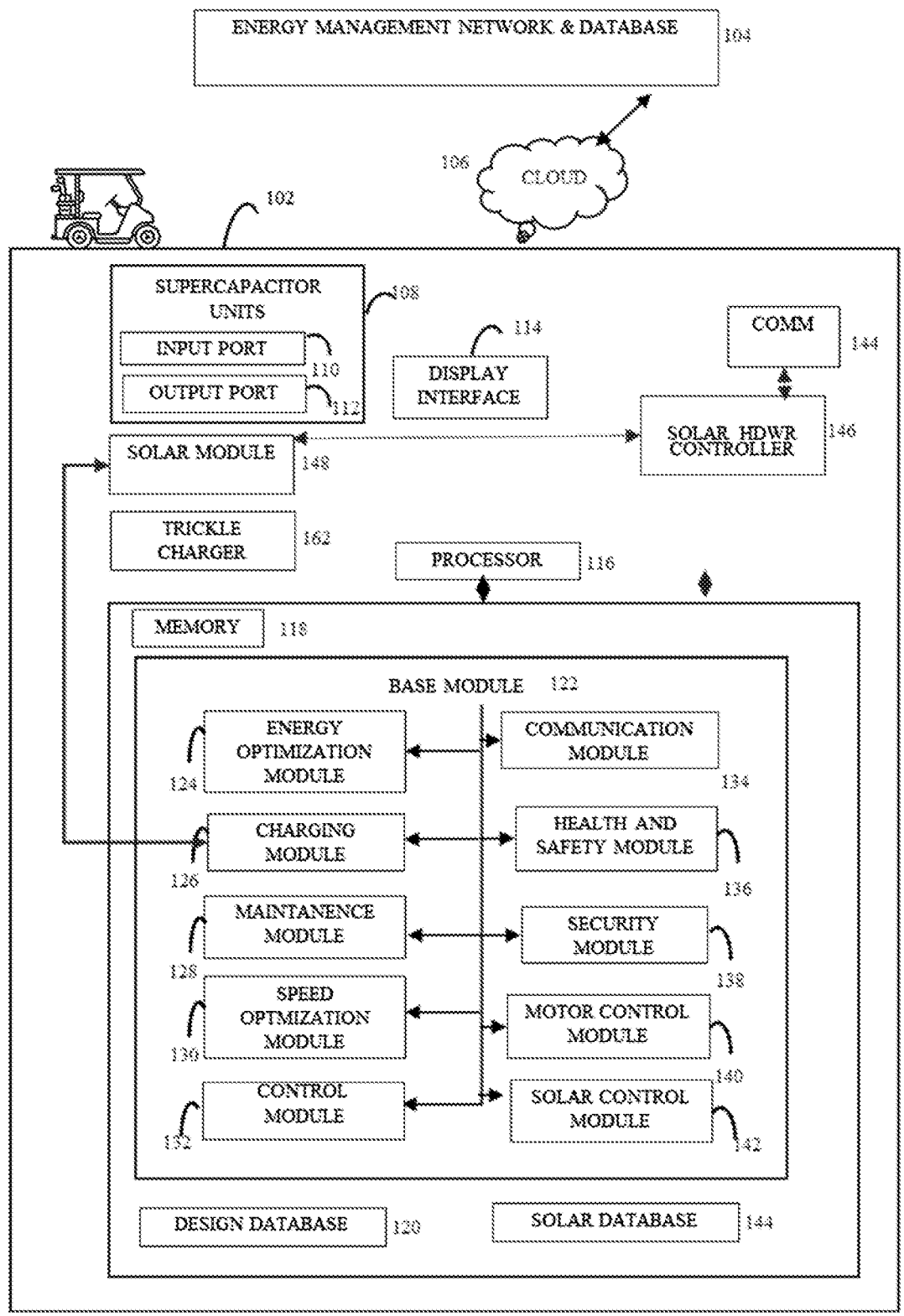
FIG. 1 is a block diagram illustrating an architecture of an energy management system, according to some examples.

Aspects of the present invention are disclosed in the following description and related figures directed to specific embodiments of the invention. Those of ordinary skill in the art will recognize that alternate embodiments may be devised without departing from the claims' spirit or scope. Additionally, well-known elements of exemplary embodiments of the invention will not be described in detail or will be omitted so as not to obscure the relevant details of the invention As used herein, the word exemplary means serving as an example, instance, or illustration. The embodiments described herein are not limiting but rather are exemplary only. It should be understood that the described embodiments are not necessarily to be construed as preferred or advantageous over other embodiments. Moreover, the terms embodiments of the invention, embodiments, or invention do not require that all embodiments include the discussed feature, advantage, or mode of operation.

Further, many of the embodiments described herein are described in sequences of actions to be performed by, for example, elements of a computing device. It should be recognized by those skilled in the art that specific circuits can perform the various sequence of actions described herein (e.g., application-specific integrated circuits (ASICs)) and/or by program instructions executed by at least one processor. Additionally, the sequence of actions described herein can be embodied entirely within any form of computer-readable storage medium. The execution of the sequence of actions enables the processor to perform the functionality described herein. Thus, the various aspects of the present invention may be embodied in several different forms, all of which have been contemplated to be within the scope of the claimed subject matter. In addition, for each of the embodiments described herein, the corresponding form of any such embodiments may be described herein as, for example, a computer configured to perform the described action.

A summary of the terminology used herein is provided concerning the embodiments.

Energy Storage Unit (ESU):

The ESU is a device that can store and deliver charge. It may comprise one or more power packs, which may comprise supercapacitors. The energy storage module may also comprise batteries, hybrid systems, fuel cells, etc. Capacitance provided in the components of the ESU may be in the form of electrostatic capacitance, pseudocapacitance, electrolytic capacitance, electronic double-layer capacitance, and electrochemical capacitance, and a combination thereof, such as both electrostatic double-layer capacitance and electrochemical pseudocapacitance, as may occur in supercapacitors. The ESU may be associated with or comprise control hardware and software with suitable sensors, as needed, for an energy control system (ECS) to manage any of the following: temperature control, discharging of the ESU whether collectively or of any of its components, charging of the ESU whether collectively or of any of its components, maintenance, interaction with batteries, battery emulation, communication with other devices, including devices that are directly connected, adjacent, or remotely such as by wireless communication, etc. In some aspects, the ESU may be portable and provided in a casing containing at least some components of the energy control system (ECS) and features such as communication systems, a display interface, etc.

The term supercapacitor as used herein can also refer to an ultracapacitor, which is an electrical component capable of holding hundreds of times more electrical charge quantity than a standard capacitor. This characteristic makes ultracapacitors useful in devices that require relatively little current and low voltage. In some situations, an ultracapacitor can take the place of a rechargeable low-voltage electrochemical battery. In some examples, the terms supercapacitor or ultracapacitor as used herein can also refer to other types of capacitors.

Energy Control System (ECS)

The energy control system (ECS) combines hardware and software that manages various aspects of the ESU, including its energy to the device. The ECS regulates the energy storage unit (ESU) to control discharging, charging, and other features as desired, such as temperature, safety, efficiency, etc. The ESU may be adapted to give the ECS individual control over each power pack or optionally over each supercapacitor or grouped supercapacitor unit to tap the available power of individual supercapacitors efficiently and to properly charge individual supercapacitors rather than merely providing a single level of charge for the ESU as a whole that may be too little or too much for individual supercapacitors or their power packs.

The ECS may comprise or be operatively associated with a processor, a memory comprising code for the controller, a database, and communication tools such as a bus or wireless capabilities for interacting with an interface or other elements or otherwise providing information, information requests, or commands. The ECS may interact with individual power packs or supercapacitors through a crosspoint switch or other matrix systems. Further, the ECS may obtain information from individual power packs or their supercapacitors through similar switching mechanisms or direct wiring in which, for example, one or more of a voltage detection circuit, an amperage detection circuit, a temperature sensor, and other sensors or devices may be used to provide details on the level of charge and performance of the individual power pack or supercapacitor.

The ECS may comprise one or more modules that the processor can execute or govern according to code stored in a memory such as a chip, a hard drive, a cloud-based source, or another computer-readable medium.

The ECS may therefore manage any or all of the following: temperature control, discharging of the ESU whether collectively or of any of its components, charging of the ESU whether collectively or of any of its components, maintenance, interaction with batteries, or battery emulation, and communication with other devices, including devices that are directly connected, adjacent, or remotely such as by wireless communication.

The ECS may comprise one or more energy source modules that govern specific energy storage devices, such as a supercapacitor module for governing supercapacitors and a lithium module for governing lithium batteries. A lead-acid module for governing lead-acid batteries and a hybrid module for governing the combined cooperative use of a supercapacitor and a battery. Each of the energy storage modules may comprise software encoding algorithms for control such as for discharge or charging or managing individual energy sources, and may comprise or be operationally associated with hardware for redistributing charge among the energy sources to improve the efficiency of the ESU, for monitoring charge via charge measurement systems such as circuits for determining the charge state of the respective energy sources, etc., and may comprise or be operationally associated with devices for receiving and sending information to and from the ECS or its other modules, etc. The energy source modules may also cooperate with a charging module responsible for guiding the charging of the overall ESU to ensure a properly balanced charge and a discharge module that guides the efficient discharging of the ESU during use which may also seek to provide proper balance in the discharging of the energy sources.

The ECS may further comprise a dynamic module for managing changing requirements in power supplied. In some aspects, the dynamic module comprises anticipatory algorithms that seek to predict upcoming changes in power demand and adjust the state of the ECS to be ready to handle the change more effectively. For example, in one case, the ECS may communicate with a GPS and terrain map for the route being taken by the electric vehicle and recognize that a steep hill will soon be encountered. The ECS may anticipate the need to increase torque and thus the delivered electrical power from the ESU and thus activate additional power packs if only some are in use or otherwise increase the draw from the power packs to handle the change in slope efficiently to achieve desired objectives such as maintaining speed, reducing the need to shift gears on a hill, or reducing the risk of stalling or other problems.

The ECS may also comprise a communication module and an associated configuration system to properly configure the ECS to communicate with the interface or other aspects of the vehicle and communicate with central systems or other vehicles when desired. In such cases, a fleet of vehicles may be effectively monitored and managed to improve energy efficiency and track the performance of vehicles and their ESUs, thereby providing information that may assist with maintenance protocols. Such communication may occur wirelessly or through the cloud via a network interface, share information with various central databases, or access information from databases to assist with the vehicle's operation and the optimization of the ESU, for which historical data may be available in a database.

Databases of use with the ECS include databases on the charge and discharge behavior of the energy sources in the ESU to optimize both charging and discharging in use based on known characteristics, databases of topographical and other information for a route to be taken by the electric vehicle or an operation to be performed by another device employing the ESU, wherein the database provides guidance on what power demands are to be expected in advance to support anticipatory power management wherein the status of energy sources. The available charge is prepared in time to deliver the needed power proactively. Charging databases may also help describe the characteristics of an external power source used to charge the ESU. The external charge characteristics can prepare for impedance matching or other measures needed to handle a new input source to charge the ESU. With that data, the external power can be received with reduced losses and reduced risk of damaging elements in the ESU by overcharge, an excessive ripple in the current, etc.

Beyond relying on static information in databases, in some aspects, the controller is adapted to perform machine learning and to learn from situations faced constantly. In related aspects, the processor and the associated software form a "smart" controller based on machine learning or artificial intelligence adapted to handle a wide range of input and a wide range of operational demands.

ESU Hardware
Charging and Discharging Hardware

The charging and discharging hardware comprises the wiring, switches, charge detection circuits, current detection circuits, and other devices for proper control of charge applied to the power packs or the batteries or other energy storage units and temperature-control devices such as active cooling equipment and other safety devices. Active cooling devices (not shown) may include fans, circulating heat transfer fluids that pass through tubing or, in some cases, surround or immerse the power packs, thermoelectric cooling such as Peltier effect coolers, etc.

To charge and discharge an individual unit among the power packs to optimize the overall efficiency of the ESU, methods are needed to select one or more of many units from what may be a three-dimensional or two-dimensional array of connectors to the individual units. Any suitable methods and devices may be used for such operations, including crosspoint switches or other matrix switching tools. Crosspoint switches and matrix switches are means of selectively connecting specific lines among many possibilities, such as an array of X lines (X1, X2, X3, etc.) and an array of Y lines (Y1, Y2, Y3, etc.) that may respectively have access to the negative or positive electrodes or terminals of the individual units among the power packs as well as the batteries or other energy storage units. SPST (Single-Pole Single-Throw) relays, for example, may be used. By applying a charge to individual supercapacitors within power packs or to individual power packs within the ESU, a charge can be applied directly to where it is needed, and a supercapacitor or power pack can be charged to an optimum level independently of other power packs or supercapacitors.

Configuration Hardware

The configuration hardware comprises the switches, wiring, and other devices to transform the electrical configuration of the power packs between series and parallel configurations, such as that a matrix of power packs may be configured to be in series, in parallel, or some combination thereof. For example, a 12×6 array of power packs may have four groups in series, with each group having 3×6 power packs in parallel. A command can modify the configuration from the configuration module, which then causes the configuration hardware to make the change at an appropriate time (e.g., when the device is not in use).

Sensors

The sensors may include thermocouples, thermistors, or other devices associated with temperature measurement such as IR cameras, etc., as well as strain gauges, pressure gauges, load cells, accelerometers, inclinometers, velocimeters, chemical sensors, photoelectric cells, cameras, etc., that can measure the status of the power packs or batteries or other energy storage units or other characteristics of the ESU or the device as described more fully hereafter. The sensors may comprise sensors physically contained in or on the ESU or sensors mounted elsewhere, such as engine gauges in electronic communication with the ECS or its associated ESC.

Batteries and Other Energy Sources

The ESU may be capable of charging or supplementing the power provided from the batteries or other energy storage units, including chemical and nonchemical batteries, such as but not limited to lithium batteries (including those with titanate, cobalt oxide, iron phosphate, iron disulfide, carbon monofluoride, manganese dioxide or oxide, nickel cobalt aluminum oxides, nickel manganese cobalt oxide, etc.), lead-acid batteries, alkaline or rechargeable alkaline batteries, nickel-cadmium batteries, nickel-zinc batteries, nickel-iron batteries, nickel-hydrogen batteries, nickel-metal-hydride batteries, zinc-carbon batteries, mercury cell batteries, silver oxide batteries, sodium-sulfur batteries, redox flow batteries, supercapacitor batteries, and combinations or hybrids thereof.

Power Input/Output Interface

The ESU also comprises or is associated with a power input/output interface 152 that can receive charge from a device (or a plurality of devices in some cases) such as the grid or regenerative power sources in an electric vehicle (not shown) and can deliver charge to a device such as an electric vehicle (not shown). The power input/output interface may comprise one or more inverters, charge converters, or other circuits and devices to convert the current to the proper type (e.g., AC or DC) and voltage or amperage for either supplying power to or receiving power from the device it is connected to. Bidirectional DC-DC converters may also be applied.

The power input/output interface may be adapted to receive power from various power sources, such as via two-phase or three-phase power, DC power, etc. It may receive or provide power by wires, inductively, or other proper means. Converters, transformers, rectifiers, and the like may be employed as needed. The power received may be relatively steady from the grid, or other sources at voltages such as 110V, 120V, 220V, 240V, etc., or from highly variable sources such as solar or wind power amperage or voltage vary. DC sources may be, by way of example, from 1V to 0V or higher, such as from 4V to 200V, 5V to 120V, 6V to V, 2V to 50V, 3V to 24V, or nominal voltages of about 4, 6, 12, 18, 24, 30, or 48 V. Similar ranges may apply to AC sources, but also including from 60V to 300V, from 90V to250V, from V to 240 V, etc., operating at any proper frequency such as 50 Hz, 60 Hz, Hz, etc.

Power received or delivered may be modulated, converted, smoothed, rectified, or transformed in any useful way to meet better the application's needs and the requirements of the device and the ESU. For example, pulse-width modulation (PWM), sometimes called pulse-duration modulation (PDM), may be used to reduce the average power delivered by an electrical signal as it is effectively chopped into discrete parts. Likewise, maximum power point tracking (MPPT) may be employed to keep the load at the right level for the most efficient power transfer.

The power input/out interface may have a plurality of receptacles of receiving power and a plurality of outlets for providing power to one or more devices, such as AC outlets following any known outlet standard in North America, various parts of Europe, China, Hong Kong, etc.

Energy Control System (ECS)

The energy storage unit (ESU) is governed or controlled by a novel energy control system (ECS) adapted to optimize at least one of charging, discharging, temperature management, safety, security, maintenance, and anticipatory power delivery. The ECS may communicate with a user interface such as a display interface to assist in control or monitoring of the ESU and also may comprise a processor and a memory. The ECS may interact with the ESU's hardware, such as the charging/discharging hardware and a temperature control system that provides data to the ECS and responds to directions from the ECS to manage the ESU.

The energy control system (ECS) may comprise a processor, a memory, one or more energy source modules, a charge/discharge module, a communication module, a configuration module, a dynamic module, an identifier module, a security module, a safety module, a maintenance module, and a performance module.

ECS Components and Modules

Processor

The processor may comprise one or more microchips or other systems for executing electronic instructions and can provide instructions to regulate the charging and discharging hardware and, when applicable, the configuration hardware or other aspects of the ESU and other aspects of the ECS and its interactions with the device, the cloud, etc. In some cases, a plurality of processors may collaborate, including processors installed with the ESU and processors installed in a vehicle or other device.

Memory

The memory may comprise coding to operate one or more of the ECS and their interactions with other components. It may also comprise information such as databases on any aspect of the operation of the ECS, though additional databases are also available via the cloud. Such databases can include a charging database that describes the charging and discharging characteristics of a plurality or all energy sources (the power packs and the batteries or other energy storage units) to guide charging and discharging operations. Such data may also be included with energy-source-specific data provided by or accessed by the energy source modules.

The memory may be in one or more locations or components such as a memory chip, a hard drive, a cloud-based source, or another computer-readable medium, and maybe in any application form such as flash memory, EPROM, EEPROM, PROM, MROM, etc., or combinations thereof and consolidated (centralized) or distributed forms. The memory may, in whole or part, be a read-only memory (ROM) or random-access memory (RAM), including static RAM (SRAM), dynamic RAM (DRAM), synchronous dynamic RAM (SDRAM), and magneto-resistive RAM (MRAIVI), etc.

Cloud Resources

The ECS may communicate with other entities via the cloud or other means. Such communication may involve information received from and provided to one or more databases and a message center. The message center can provide alerts to an administrator responsible for the ESU and the electric vehicle or another device. For example, an entity may own a fleet of electric vehicles using ESUs and may wish to receive notifications regarding usage, performance, maintenance issues, and so forth. The message center may also authenticate the ESU or verify its authorization for use in the electric vehicle or other devices (not shown) via interaction with the security module.

Energy Source Modules

The energy source modules may comprise specific modules designed to operate a specific energy source, such as a supercapacitor module, a lithium battery module, a lead-acid battery module, or other modules. Such modules may be associated with a database of performance characteristics (e.g., charge and discharge curves, safety restrictions regarding overcharge, temperature, etc.) that may provide information for use by the safety module and the charge/discharge module, which is used to optimize how each unit within the power packs or batteries or other energy storage units is used both in terms of charging and delivering charge. The charge/discharge module seeks to provide useful work from as much of the charge as possible in the individual power packs while ensuring that individual power packs are fully charged but not damaged by overcharging. The charge/discharge module can assist in directing the charging/discharging hardware, cooperating with the energy source modules. In one aspect, the ESU thus may provide real-time charging and discharging of the plurality of power packs while the electric vehicle is continuously accelerating and decelerating along a path.

Charge/Discharge Module

The charge/discharge module is used to optimize each unit within the power packs, batteries, or other energy storage units to charge and deliver charge. The charge/discharge module seeks to provide useful work from as much of the charge as possible in the individual power packs while ensuring during charging that individual power packs are fully charged but not damaged by overcharging. The charge/discharge module can assist in directing the charging/discharging hardware, cooperating with the energy source modules. In one aspect, the ESU thus may provide real-time charging and discharging of the plurality of power packs while the electric vehicle is continuously accelerating and decelerating along a path.

The charge/discharge module may be configured to charge or discharge each of the plurality of power packs up to a threshold limit. The charge/discharge module may be coupled to the performance, energy storage, and identifier modules. It may communicate with the charging/discharging hardware of the ESU. For example, the threshold limit may be more than 90 percent capacity of each of the plurality of power packs in one aspect.

Dynamic Module

The dynamic module assists in coping with changes in operation, including acceleration, deceleration, stops, changes in slops (uphill or downhill), changes in traction or properties of the road or ground that affect traction and performance, etc., by optimizing the delivery of power or the charging that is taking place for individual power packs or batteries or other energy storage units. In addition to guiding the degree of power provided by or to individual power packs based on the current use of the device and the individual state of the power packs, in some aspects, the dynamic module provides anticipatory management of the ESU by proactively adjusting the charging or discharging states of the power packs such that added power is available as the need arises or slightly in advance (depending on time constants for the ESU and its components, anticipatory changes in status may only be needed for a few seconds (e.g., 5 seconds or less or 2 seconds or less) or perhaps only for 1 second or less such as for 0.5 seconds or less. Still, more extended preparatory changes may be needed in other cases, such as from 3 seconds to 10 seconds, to ensure that adequate power is available when needed but that power is not wasted by changing the power delivery state prematurely. This anticipatory control can involve increasing the current or voltage being delivered. Still, it can also involve increasing the cooling provided by the cooling hardware of the charging and discharging hardware in cooperation with the safety module and when suitable with the charge/discharge module.

The dynamic module may be communicatively coupled to the charge/discharge module. The dynamic module may be configured to determine the charging and discharging status of the plurality of power packs and batteries or other energy storage units in real-time. For example, in one aspect, the dynamic module may help govern bidirectional charge/discharge in real-time. The electric charge may flow from the ESU into the plurality of power packs and batteries or other energy storage units or vice versa.

Configuration Module

The ECS may comprise a configuration module configured to determine any change in the configuration of charged power packs from the charging module. For example, in one aspect, the configuration module may be provided to charge the configuration of the power packs, such as from series to parallel or vice versa. This may occur via communication with the charging/discharging hardware of the ESU.

Identifier Module

The identifier module, described in more detail hereafter, identifies the charging or discharging requirement for each power pack to assist in best meeting the power supply needs of the device. This process may require access to the database information about the individual power packs from the energy source modules (e.g., a supercapacitor module) and information about the current state of the individual power packs provided by the sensors and charge and current detections circuits associated with the charging and discharging hardware, cooperating with the charge/discharge module and, as needed, with the dynamic module and the safety module.

Safety Module

The sensors may communicate with the safety module to determine if the power packs and individual components show excessive local or system temperature signs that might harm the components. In such cases, the safety module interacts with the processor and other features (e.g., data stored in the databases of the cloud or memory pertaining to safe temperature characteristics for the ESU) to cause a change in operation such as decreasing the charging or discharging underway with the portions of the power packs or other units facing excessive temperature. The safety module may also regulate cooling systems that are part of the charging and discharging hardware to proactively increase the cooling of the power packs, batteries, or other energy storage units. Increasing the load on them does not lead to harmful temperature increases.

Thus, the safety module may also interact with the dynamic module in responding to forecasts of system demands in the near future for anticipatory control of the ESU for optimized power delivery. In the interaction with the dynamic module, the safety module may determine that an upcoming episode of high system demand such as imminent climbing of a hill may impose excessive demands on a power pack already operating at elevated temperature, and thus make a proactive recommendation to increase cooling on the at-risk power packs. Other sensors such as strain gauges, pressure gauges, chemical sensors, etc., may be provided to determine if any of the energy storage units in batteries or other energy storage units or the power packs are facing pressure buildup from outgassing, decomposition, corrosion, electrical shorts, unwanted chemical reactions such as an incipient runaway reaction, or other system difficulties. In such cases, the safety module may initiate precautionary or emergency procedures such as a shutdown, electrical isolation of the affected components, warnings to a system administrator via the communication module to the message center, a request for maintenance to the maintenance module.

Maintenance Module

The maintenance module determines when the ESU requires maintenance, either per a predetermined scheduled or when needed due to apparent problems in performance, as may be flagged by the performance module, or in issues about safety as determined by the safety module based on data from sensors or the charging/discharging hardware, and in light of information from the energy sources modules. The maintenance module may cooperate with the communication module to provide relevant information to the display interface and the message center. An administrator or owner may initiate maintenance action in response to the message provided. The maintenance module may also initiate mitigating actions to be taken, such as cooperating with the charge/discharge module to decrease the demand on one or more of the power packs in need of maintenance and may also cooperate with the configuration module to reconfigure the power packs to reduce the demand in components that may be malfunctioning of near to malfunctioning to reduce harm and risk.

Performance Module

The performance module continually monitors the results obtained with individual power packs and the batteries or other energy storage units and stores information as needed in memory and the cloud databases or via messages to the message center. The monitoring is done using the sensors and the charging/discharging hardware, etc. The tracking of performance attributes of the respective energy sources can guide knowledge about the system's health, the capabilities of the components, etc., which can guide decisions about charging and discharging in cooperation with the charge/discharge module. The performance module compares actual performance, such as power density, charge density, time to charge, thermal behavior, etc., to specifications and can then cooperate with the maintenance module to help determine if maintenance or replacement is needed, and alert an administrator via the communication module with a message to the message center about apparent problems in product quality.

Security Module: Security and Anti-Counterfeiting Measures

The security module helps reduce the risk of counterfeit products or theft or misuse of legitimate products associated with the ESU, thus including one or more methods for authenticating the nature of the ESU and authorization to use it with the device in question. Methods of reducing the risk of theft or unauthorized use of an ESU or its respective power packs can include locks integrated with the casing of the ESU that mechanically secure the ESU in the electric vehicle or other devices, wherein a key, a unique fob, a biometric signal such as a fingerprint or voice recognition system, or other security-related credentials or may be required to enable removal of the ESU or even operation thereof.

In another aspect, the ESU comprises a unique identifier (not shown) that can be tracked, allowing a security system to verify that a given ESU is authorized for use with the device, such as an electric vehicle or other devices. For example, the casing of the ESU or one or more power packs therein may have a unique identifier attached, such as an RFID tag with a serial number (an active or passive tag), a holographic tag with unique characteristics equivalent to a serial number or password, nanoparticle markings that convey a unique signal, etc. One good security tool that may be adapted for the security of the ESU is a bar code or QR code with unique characteristics not visible to the human eye that cannot be readily copied.

Yet another approach relies at least in part on the unique electronic signature of the ESU and one or more individual power packs or of one or more supercapacitor units therein. The principle will be described relative to an individual power pack but may be adapted to an individual supercapacitor or collectively to the ESU as a whole. When a power pack comprising supercapacitors is charged from a low voltage or relatively discharged state, the electronic response to a given applied voltage depends on many parameters, including microscopic details of the electrode structure such as porosity, pore size distribution, and distribution of coating materials, or details of electrolyte properties, supercapacitor geometry, etc., as well as macroscopic properties such as temperature. At a specified temperature or temperature range and under other suitable macroscopic conditions (e.g., low vibration, etc.), the characteristics of the power pack may then be tested using any suitable tool capable of identifying a signature specific to the individual power pack.

Communication Module

The communication module can govern communications between the ECS and the outside world, including communications through the cloud, such as making queries and receiving data from various external databases or sending messages to a message center where they may be processed and archived by an administrator, a device owner, the device user, the ESU owner, or automated systems. In some aspects, the communication module may also oversee communication between modules or between the ESU and the ECS and work in cooperation with various modules to direct information to and from the display interface. Communications within a vehicle or between the ECS or ESU and the device may involve a DC bus or other means such as separate wiring. Any suitable protocol may be used, including UART, LIN (or DC-LIN), CAN, SPI, I2C (including Intel's SMBus), and DMX (e.g., DMX512). In general, communications from the ECS or ESU with a device may be over a DC bus or, if needed, over an AC/DC bus, or by separately wired pathways if desired, or wireless.

Communication to the cloud may occur via the communication module and involve wired or wireless connections. If wireless, various communication techniques may be employed such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques.

Electrostatic Module

Assessment of charge in an energy storage unit can be conducted based on measurements made with the charging/discharging hardware in communication with specific modules of the ECS. In general, an electrostatic module can manage the measurement of charge and processing of the data.

The electrostatic module may be configured to identify the power pack type and the capacity of each power pack connected to the modular multi-type power pack energy storage unit. Further, the electrostatic module may be configured to retrieve information related to the type of power packs from the charging database. The electrostatic module may determine the capacity of each power pack to be charged. It may be configured to determine the capacity of each power pack when connected to the modular multi-type power pack ESU.

The electrostatic module may be configured to determine if each power pack charged below the threshold limit. For example, in one aspect, the electrostatic module may check whether each of the plurality of power packs may have a capacity below the threshold limit. The electrostatic module may also be configured to send data related to power packs to the ECS.

Various Databases

The ECS may access various databases via an interface to the cloud and store retrieved information in the memory to guide the various modules.

Further, the memory may comprise a charging database or information from such a database obtained from the databases or the cloud. In one aspect, the charging database may be configured to store information related to various power packs used while charging and discharging from the ESU. In one aspect, the charging database may be configured to store information related to the power cycle of each of the plurality of power packs, the maximum and minimum charge for different types of power packs, and the state of charge (SoC) profile of each of the plurality of power packs.

The charging database may be configured to store information related to managing the plurality of power packs, such as the type of power pack to be charged, safety specifications, recent performance data, bidirectional charging requirements, or history of each of the plurality of power packs, etc. In another aspect, the stored information may also include, but is not limited to, the capacity of each of the plurality of power packs, amount of charge required for one trip of the electric vehicle along the path, such as golf course, etc., charging required for a supercapacitor unit, etc. In another aspect, the charging database may provide a detailed research report for the electric vehicle's average electric charge consumption over a path. In one aspect, the charging database may be configured to store information of the consumption of the electric charge per unit per kilometer drive of the electric vehicle from the plurality of power packs. For example, such information may indicate that a golf cart is equipped with five supercapacitor-driven power packs each at 90% charge, with each power packable to supply a specified amount of ampere-hours (Ah) of electric charge resulting in an ability to drive under normal conditions at top speed for, say, 80 kilometers. The information may also indicate that a solar cell installed on the roof of the golf cart would, under current partly clouded conditions, still provide enough additional charge over the planned period of use to extend the capacity of the ESU by another 40 kilometers for one passenger.

The performance module may use the charging database to read data and store new data on the individual energy storage units such as the power packs.

Power Pack

A power pack is a unit that can store and deliver charge within an energy storage unit and comprises one or more supercapacitors such as supercapacitors in series and parallel. It may further comprise or cooperate with temperature sensors, charge and current sensors (circuits or other devices), connectors, switches such as crosspoint switches, safety devices, and control systems such as charge and discharge control systems. In various aspects described herein, the power pack may comprise a plurality of supercapacitors and have an energy density greater than 200 kWhr/kg, 230 kWhr/kg, 260 kWhr/kg, or 300 kWhr/kg, such as from 200 to 500 kWhr/kg, or from 250 to 500 kWhr/kg. The power pack may have a functional temperature range from −70° C. to +° C., such as from −50° C. to ° C. or from −40° C. to 80° C. The voltage provided by the power pack may be any practical value such as 3V or more significant, such as from 3V to 240 V, 4V to 120 V, etc.

By way of example, a power pack may comprise one or more units, each comprising at least one supercapacitor having a nominal voltage from 2 to 12 V, such as from 3 to 6 V, including supercapacitors rated at about 3, 3.5, 4, 4.2, 4.5, and 5 V. For example, in discharge testing, a power pack was provided and tested with 14 capacitors in series and five series in parallel charged with 21,000 F at 4.2 V and had 68-75 Wh. Power packs may be packaged in protective casings that can easily be removed from an ESU and replaced. They may also comprise connectors for charging and discharging. Power packs may be provided with generally rectilinear casings, or they may have cylindrical or other useful shapes.

Supercapacitor Information

Supercapacitors

A supercapacitor may have two electrode layers separated by an electrode separator wherein each electrode layer is electrically connected to a current collector supported upon an inert substrate layer; further comprising an electrolyte-impervious layer disposed between each electrode layer and each conducting layer to protect the conducting layer, and a liquid electrolyte disposed within the area occupied by the active electrode layers and the electrode separator. To inhibit electrolyte flow, the liquid electrolyte may be an ionic liquid electrolyte gelled by a silica gellant or other gellant.

The supercapacitor may comprise an electrode plate, an isolation film, a pole, and a shell. The electrode plate comprises a current collector, and a coating is disposed of on the current collector. The coating may comprise an active material that may include carbon nanomaterial such as graphene or carbon nanotubes, including nitrogen-doped graphene, a carbon nitride, carbon materials doped with a sulfur compound such as thiophene or poly 3-hexylthiophene, etc., or graphene on which is deposited nanoparticles of metal oxide such as manganese dioxide. The coating may further comprise a conductive polymer such as one or more polyaniline, polythiophene, and polypyrrole. Such polymers may be doped with various substances such as boron (especially in the case of polyaniline).

Electrodes in supercapacitors may have thin coatings in electrical communication with a current collector, to provide high electrode surface area for high performance, electrodes may comprise porous material with a high specific surface area such as graphene, graphene oxide, or various derivatives of graphene, carbon nanotubes or other carbon nanomaterials including activated carbon, nitrogen-doped graphene or another doped graphene, graphite, carbon fiber-cloth, carbide-derived carbon, carbon aerogel. They may comprise various metal oxides such as oxides of manganese, etc. All such materials may be provided in multiple layers and generally planar, cylindrical, or other geometries. Electrolytes in the supercapacitor may include semi-solid or gel electrolytes, conductive polymers or gels thereof, ionic liquids, aqueous electrolytes, and the like. Solid-state supercapacitors may be used.

Supercapacitors may be provided with various indicators and sensors about charge state, temperature, and other performance and safety aspects. An actuation mechanism may be integrated to prevent undesired discharge. The voltage of an individual supercapacitor may be greater than 2 V, such as from 2.5 V to 5 V, 2.7 V to 8 V, 2.5 V to 4.5 V, etc.

Supercapacitors can be divided into units of smaller supercapacitors. In some examples, a "constant voltage unit" of five units can be joined together in parallel to maintain the voltage but supply five times more current. In another embodiment, a "constant current unity" can include five units joined together in series to multiply the unit voltage by five times but maintain the current. In another embodiment, supercapacitors can provide hybrid "constant voltage units" and "constant current units." In yet another embodiment, supercapacitors units can be connected in any number of combinations to end up with a supercapacitor of optimum design. In another embodiment, each supercapacitor unit can comprise various subunits or pouches. Supercapacitor subunits can be combined using constant current, voltage, or any combination. Supercapacitor units or sub-units can comprise size or form factors in yet another embodiment. In yet another embodiment, each subunit and unit can be uniquely addressed to turn on or off the supercapacitor unit or sub-unit on or off. This is achieved with any variety of crossbar switches. A crossbar switch is an assembly of individual switches between inputs and a set of outputs. The switches are arranged in a matrix. If the crossbar switch has M inputs and N outputs, then a crossbar has a matrix with M×N cross-points or places where the connections cross. At each crosspoint is a switch; when closed, it connects one of the inputs to one of the outputs. A given crossbar is a single layer, non-blocking switch. A non-blocking switch means that other concurrent connections do not prevent connecting other inputs to other outputs. Collections of crossbars can be used to implement multiple layers and blocking switches. A crossbar switching system is also called a coordinate switching system. In this way, a crossbar switch can select any combinations of pouches or subunits and units to obtain any combination. The crossbar switches can be used to test units or subunits and optimize supercapacitor performance.

Powered Devices and Electric Vehicles, etc.

Powered devices powered by the ESU can include electric vehicles and other transportation devices of all kinds, such as those for land, water, or air, whether adapted to operate without passengers or with one or more passengers. Electric vehicles may include automobiles, trucks, vans, forklifts, carts such as golf carts or baby carts, motorcycles, electric bikes scooters, autonomous vehicles, mobile robotic devices, hoverboards, monowheels, Segways® and other personal transportation devices, wheelchairs, drones, personal aircraft for one or more passengers and other aeronautical devices, robotic devices, aquatic devices such as boats or personal watercraft such as boats, Jet Skis®, diver propulsion vehicles or underwater scooters, and the like, etc. The electric vehicle generally comprises one or more motors connected to the ESU and an energy control system (ECS) that controls the power delivered from the ESU and may comprise a user interface that provides information and control regarding the delivery of power from the ESU as well as information regarding performance, remaining charge, safety, maintenance, security, etc. Not all transportation devices require non-stationary motors. An elevator, for example, may have a substantially stationary motor while the cabin moves between the level of a structure. Other transport systems with mobile cabins, seats, or walkways may be driven by stationary motors driving cables, chains, gears, bands, etc.

Apart from electric vehicles, there are many other devices that the ESU may power in cooperation with the ESC. Such other devices can include generators, which in turn can power an endless list of electric devices in households and industry. ESUs of various sizes and shapes can also be integrated with a variety of motors, portable devices, wearable or implantable sensors, medical devices, acoustic devices such as speakers or noise cancellation devices, satellites, robotics, heating and cooling devices, lighting systems, rechargeable food processing tools and systems of all kinds, personal protection tools such as tasers, lighting and heating systems, power tools, computers, phones, tablets, electric games, etc. In some versions, the powered device is the grid, and in such versions, the ESU may comprise an inverter to turn DC into AC suitable for the grid.

In some aspects, a plurality of devices such as electric vehicles may be networked together via a cloud-based network, wherein the devices share information among themselves and with a central message center such that an administrator can assist in managing the allocation of resources, oversee maintenance, evaluate the performance of vehicles and ESUs, upgrade software or firmware associated with the ESC to enhance performance for the particular needs of individual users or a collective group, adjust operational settings to better cope with anticipated changes in weather, traffic conditions, etc., or otherwise optimize performance.

Implementation in Hybrid Vehicles

When installed in electric vehicles, the ESU may comprise both power packs and one or more lead-acid batteries or other batteries. The ESU may power both the motor and the onboard power supply system. The display interface of the associated ESC may comprise a graphical user interface such as the vehicle's control panel (e.g., a touch panel). The display interface may also comprise audio information and verbal input from a user.

Motors

The ESU may power any electric motor. The major classes of electric motors are: 1) DC motors, such as series, shunt, compound wound, separately excited (wherein the connection of stator and rotor is made using a different power supply for each), brushless, and PMDC (permanent magnet DC) motors, 2) AC motors such as synchronous, asynchronous, and induction motors (sometimes also called asynchronous motors), and 3) special purpose motors such as servo, operation per, linear induction, hysteresis, universal (a series-wound electric motor that can operate on AC and DC power), and reluctance motors.

Display Interface

The display interface of the ESC may be displayed on or in the device, such as on a touch screen or other display in a vehicle or on the device, or it may be displayed by a separate device such as the user's phone. The display interface may comprise or be part of a graphic user interface such as the vehicle's control panel (e.g., a touch panel). The display interface may also comprise audio information and verbal input from a user. It may also be displayed on the ESU itself or a surface connected to or communicated with the ESU. In one version, the display interface may include but is not limited to a video monitoring display, a smartphone, a tablet, and the like, each capable of displaying a variety of parameters and interactive controls. Still, the display could also be as simple as one or more lights indicating charging or discharging status and optionally one or more digital or analog indicators showing remaining useful lifetime, % power remaining, voltage, etc.

Further, the display interface may be any state-of-the-art display means without departing from the scope of the disclosure. In some aspects, the display interface provides graphical information on charge status, including one or more fractions of charge remaining or consumed, remaining useful life of the ESU or its components (e.g., how many miles of driving or hours of use are possible based on current or projected conditions or based on an estimate of the average conditions for the current trip or period of use), and may also provide one or more user controls to allow selection of settings. Such settings may include low, medium, or high values for efficiency, power, etc.; adjustment of operating voltage when feasible; safety settings (e.g., prepare the ESU for shipping, discharge the ESU, increase active cooling, only apply low power, etc.); planned conditions for use (e.g., outdoors, high-humidity, in the rain, underwater, indoors, etc.). Selections may be made through menus and buttons on a visual display, through audio "display" of information responsive to verbal commands, or through text commands or displays transmitted to a phone or computer, including text messages or visual display via an app or web page.

Thus, the ESU may comprise a display interface coupled to the processor to continuously display the status of charging and discharging the plurality of power packs.

Solar Power and Alternate Energy Systems

Solar panels produce electrical power through the photovoltaic effect, converting sunlight into DC electricity. This DC electricity may be fed to a battery via a solar regulator to ensure proper charging and prevent damage to the battery. While DC devices can be powered directly from the battery or the regulator, AC devices require an inverter to convert the DC electricity to suitable AC at, for example, 110V, 120V, 220V, 240V, etc.

Solar panels may be wired in series or in parallel to increase voltage or current, respectively. The rated terminal voltage of a 12 Volt solar panel maybe around 17 Volts, but the regulator may reduce the voltage to a lower level required for battery charging.

Solar Regulators

Solar regulators (also called charge controllers) regulate current from the solar panels to prevent battery overcharging, reducing or stopping current as needed. They may also include a Low Voltage Disconnect feature to switch off the supply to the load when the battery voltage falls below the cut-off voltage and prevent the battery from sending charge back to the solar panel in the dark.

Regulators may operate with a pulse width modulation (PWM) controller, in which the current is drawn out of the panel at just above the battery voltage, or with a maximum power point tracking (MPPT) controller, in which the current is drawn out of the panel at the panel "maximum power voltage," dropping the current-voltage like a conventional operation-down DC-DC converter but adding the "smart" aspect of monitoring of the variable maximum power point of the panel to adjust the input voltage of the DC-DC converter to deliver optimum power.

Inverters

Inverters are devices that convert DC power to AC electricity. They come in several forms, including on-grid solar inverters that convert the DC power from solar panels into AC power which can be used directly by appliances or be fed into the grid. Off-grid systems and hybrid systems can also provide power to batteries for energy storage but are more complex and costly than on-grid systems, requiring additional equipment. An inverter/charger that manages both grid connection and the charging or discharging of batteries may be an interactive or multi-mode inverter. A variation of such inverters is known as the all-in-one hybrid inverter.

Output from inverters may be in the form of a pure sine wave or a modified sine wave or a square wave. The less expensive modified sine wave output may damage some electronic equipment. Multiple solar panels are connected to a single inverter in a "string inverter" setup in many conventional systems. This can limit system efficiency, for when one solar panel is shaded and has reduced power, the overall current provided to the inverter is likewise reduced. String solar inverters are provided in single-phase and three-phase versions.

Microinverters are miniature forms of inverters that can be installed on the back of individual solar panels, providing the option for AC power to be created directly by the panel. For example, LG (Seoul, Korea) produces solar panels with integrated microinverters. Unfortunately, microinverters limit battery charging efficiency, for the AC power from the panels must be converted back to DC power for battery charging. They also add high costs to the panels. The additional equipment on the panel may also increase maintenance problems and possibly the risk of lightning strikes. Microinverters generally use maximum power point tracking (MPPT) to optimize power harvesting from the panel or module connected to it.

The on-grid string solar inverters and microinverters, collectively called solar inverters, provide AC power fed to the grid or directly to a home or office. Alternatively, off-grid inverters (or "battery inverters") or hybrid inverters can charge batteries. Hybrid inverters can charge batteries with DC and provide AC for the grid or local devices, combining a solar inverter and battery inverter/charger into a single unit. An example of a hybrid inverter is the Conext SW 120/240 VAC hybrid inverter charger 48 VDC (865-4048) by Schneider Electric (Rueil-Malmaison, France) is a 4 kW (4000 watts) pure sine wave inverter or the 2.3 kW Outback Power Hybrid On/Off-grid Solar Inverter Charger 1-Ph 48 VDC by Outback Power (Phoenix, AZ).

Solar power systems may employ "deep cycle solar batteries" designed for discharge over a long time (e.g., several days). Such batteries may be at risk of permanent damage if highly discharged, such as below 30% capacity. They also may suffer the drawback of delivering less total charge at a high load than at a low load due to overheating problems at elevated discharge rates.

Misc.:

All patents and applications cited must be understood as being incorporated by reference to their compatible degree. d For all ranges given herein, it should be understood that any lower limit may be combined with any upper limit when feasible. Thus, for example, citing a temperature range of from 5° C. to ° C. and from 20° C. to 200° C. would also inherently include a range of from 5° C. to 200° C. and a range of 20° C. to ° C.

When listing various aspects of the products, methods, or system described herein, it should be understood that any feature, element, or limitation of one aspect, example, or claim may be combined with any other feature, element, or limitation of any other aspect when feasible (i.e., not contradictory). Thus, disclosing an example of a power pack comprising a temperature sensor and then a different example of a power pack associated with an accelerometer would inherently disclose a power pack comprising or associated with an accelerometer and a temperature sensor.

Unless otherwise indicated, components such as software modules or other modules may be combined into a single module or component or divided. The function involves the cooperation of two or more components or modules. Identifying an operation or feature as a single discrete entity should be understood to include division or combination such that the effect of the identified component is still achieved.

Some embodiments of this disclosure, illustrating its features, will now be discussed in detail. It can be understood that the embodiments are intended to be open-ended in that an item or items used in the embodiments is not meant to be an exhaustive listing of such items or items or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used to practice or test embodiments, only some exemplary systems and methods are now described.

FIG. 1 is a block diagram illustrating an architecture of an energy management system 100. The energy management system 100 may be part of a vehicle, such as an electric vehicle powered using supercapacitors(s) and/or batterie(s). The energy management system 100 may comprise the electric vehicle 102. In some embodiments, the electric vehicle 102 may correspond to but is not limited to a golf cart, an electric car, and an electric bike. In some examples, the energy management system 100 may be referred to as a system for enhancing the capability of the electric vehicle 102 using ultra-capacitors or supercapacitors in series or parallel.

Further, the energy management system 100 may provide a smart energy management system to supply electric charge to the vehicle motor of the electric vehicle 102 from supercapacitors in a controlled manner to maximize charge efficiency. Further, the energy management system 100 may provide ultra-capacitors with real-time charging and discharging while the electric vehicle 102 is continuously accelerating and decelerating along a predefined path. In some examples, the energy management system 100 may be referred to as a modular graphene supercapacitor power pack for powering the electric vehicle 102.

Further, the energy management system 100 may comprise an energy management database 104 communicatively coupled to the electric vehicle 102 via a cloud 106 or directly to the processor (not shown). In some examples, the energy management database 104 may be configured to provide historical data related to the electric vehicle 102. In another embodiment, the energy management database 104 may provide a research report for an average charge consumption of the electric vehicle 102 over a predefined path. In some examples, the energy management database 104 may store information related to supercapacitor units, electric charge percentage, acceleration of motor, and electric charge in the supercapacitor units, as well as data for individual drivers, driving conditions (temperature, weather, time of year or day), power pack identity or characteristics, the mass of the vehicle and passengers and cargo (this may require load cells installed in the vehicle or an external device for weighing the vehicle), etc., in the energy management database 104. Further, embodiments may include a cloud 106. It can be noted that cloud 106 may facilitate a communication link among the components of the energy management system 100. It can be noted that cloud 106 may be a wired and a wireless network. The cloud 106, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques, known in the art. In some embodiments, the cloud connection could be replaced by a "bus" to connect the processor to any other controller or memory unit (not shown) in the cloud 106.

Further, the energy management system 100 may comprise a plurality of supercapacitor units 108 disposed within the electric vehicle 102. Supercapacitor unit 108 could be, for example, is a 21,000 F 4.2V nano-pouch graphene energy module with a final 48V 100 AH Graphene Power Pack. The 21,000 F 4.2V nano-pouch graphene energy modules may contain many layers of a graphene lattice matrix structure deposited using a unique method of electropolymerization that provides a highly dense energy storage module design with high-current energy transfer. Due to the tightly coupled nanotechnology design and manufacturing methods, energy storage and delivery can be cycled thousands of times without matrix degradation. This power pack is a capacitive battery substitute in nature, graphene-based, and contains no lithium or other chemical conversion components. In some examples, the plurality of supercapacitor units 108 may be continuously charged in real-time, depending upon the usage of the electric vehicle 102, such as through the use of solar panels, inductive charging, etc., and optionally by redistributing charge among individual supercapacitors or supercapacitor units (a single supercapacitor unit 108 may comprise multiple supercapacitors internally). Alternatively or in addition, supercapacitor units 108 may be charged while connected to a suitable charging source such as an AC power line (not shown) or DC power (not shown) n alternative energy source such as solar power, wind power, etc., where a trickle charging system may be applied, in the supercapacitor units 108. Further, the plurality of supercapacitor units 108 may comprise an input port 110 and an output port 112. Further, the input port 110 may be provided to charge the plurality of supercapacitor units 108. The output port 112 may be provided to connect the plurality of supercapacitor units 108 to the electric vehicle 102 or any other device. Input port 110 and output port 112 may be used for testing the supercapacitor unit 108 (not shown) in input port 110. In some examples, the output port 112 may be provided with a connector to connect the plurality of supercapacitor units 108 to the electric vehicle 102. In some examples, each of the plurality of supercapacitor units 108 may comprise a plurality of power pack units coupled to each other in series or parallel. In some examples, the plurality of supercapacitor units 108 may enhance the performance of the electric vehicle 102 by supplying the electric charge according to the desired need of the electric vehicle 102, in output port 112.

Further, the charging and discharging of each of the plurality of supercapacitor units 108 may be displayed over a display interface 114 (not shown). In some examples, the display interface 114 may be integrated within the electric vehicle 102. The display interface 114 may be, but is not limited to, a video monitoring display, a smartphone, and a tablet, each capable of displaying a variety of parameters and interactive controls, but could also be as simple as one or more lights indicating charging or discharging status and optionally one or more digital or analog indicators showing remaining useful lifetime, % power remaining, voltage, etc. It should be noted that instructions related to managing the plurality of supercapacitor units 108 may be stored in the energy management database 104. Further, a user may retrieve the store instructions from the energy management database 104 before driving the electric vehicle 102. In some examples, the stored instructions may include but are not limited to the capacity of each of the plurality of supercapacitor units 108, amount of charge required for one trip of electric vehicle 102 along the path, such as golf course, etc., charging required for a supercapacitor unit, and acceleration and deceleration data related to the path of the electric vehicle 102. The energy management database 104 need not comprise details about the route and its characteristics. Still, it may interact with a GPS, terrain database, or other sources of information (not shown) to enable the needed computations in display interface 114. Further, the energy management system 100 may be operatively associated with a processor 116, a memory unit 118, and a design database 120. In some examples, the processor 116 may be comprised within the electric vehicle 102 or integrated within the casing or other components of the energy management system 100 or may have components distributed in two or more locations. Further, processor 116 may be configured to retrieve the electric vehicle 102, the plurality of supercapacitor units 108 from the energy management database 104, the terrain or route, and other parameters via the cloud 106 and other remote sources. In some examples, the retrieved information related to the electric vehicle 102 may be stored in real-time into the memory unit 118, for instance using the processor 116. Further, the memory unit 118 may be configured to retrieve information related to the performance of the electric vehicle 102 from the design database 120, in memory unit 118. In some examples, the design database 120 stores the self-discharge rate of the supercapacitor units 108.

In some examples, the design database 120 may be configured to store the consumption of electric charge per unit per kilometer drive of the electric vehicle 102. For example, an electric vehicle 1 with ten supercapacitor units installed consumes 5 kW/h of electric charge for one hour to drive the electric vehicle 1 for a distance of one kilometer at a characteristic speed of 7 m/s (about 16 mph) with an initial acceleration of, say, 23 M/s2. Further, for an electric vehicle 2 with 15 supercapacitor units installed, it consumes 8 kW/h of electric charge for one hour to drive the electric vehicle 2 for a distance of one kilometer with an acceleration of 42 m/s2. Further, for an electric vehicle 3 with 13 supercapacitor units installed, it consumes 4 kW/h of electric charge for one hour to drive the electric vehicle 3 for a distance of one kilometer with an acceleration of 26 m/s2. Further, for an electric vehicle 4 with 12 supercapacitor units installed, it consumes 3 kW/h of electric charge for one hour to drive the electric vehicle 4 for a distance of one kilometer with an acceleration of 24 m/s2. Further, for an electric vehicle 5 with 20 supercapacitor units installed, it consumes 10 kW/h of electric charge for one hour to drive the electric vehicle 5 for a distance of one kilometer with an acceleration of 46 m/s2, in design database 120.

Further, the energy management system 100 may comprise a plurality of modules to evaluate and enhance the performance of the electric vehicle 102. In some examples, the energy management system 100 may comprise or be operatively associated with a base module 122 communicatively coupled to the processor 116. In another embodiment, base module 122 may reside in whole or in part in memory 118. In some examples, the base module 122 may act as a central module to receive and send instructions to/from each of the plurality of modules. In some examples, the base module 122 may be configured to manage at least two parameters related to the electric vehicle 102, such as, but are not limited to, electric charge of the plurality of supercapacitor units 108 and the performance of the electric vehicle 102 when the electric vehicle 102 receives a predefined amount of electric charge from the plurality of supercapacitor units 108, in base module 122. Further, the base module 122 may comprise an energy optimization module 124 to optimize the electric charge of the plurality of supercapacitor units 108.

In some examples, the energy optimization module 124 may be configured to determine the percentage of electric charge available in each of the plurality of supercapacitor units 108. In some examples, the energy optimization module 124 may be configured to collect data related to each of the plurality of supercapacitor units 108 required for one run time of the electric vehicle 102 along the predefined path. The Energy Optimization Module 124 is designed to rely on supercapacitors' premeasure performance, such as the charge curve over time and the discharge curve overtime at various loads. Once this premeasured performance is defined, it is stored in a database (not shown). The Energy Optimization Module 124 may also rely on other curves such as, but not related to voltage vs. current charge and discharge curves, temperature as a discharge function under various loads, humidity versus storage time as a particular voltage, etc. The Energy Optimization module may, for example, evaluate the future load prediction due to a user-defined map, where the energy optimization module 124 may determine that 5 out of 10 batteries would be sufficient for the prediction, so the energy optimization module 124 determinations may inform which batteries may be used for the predicted trip. The energy optimization module 124, using suer capacitor premeasurements, may determine that even though 5 out of 10 batteries would be sufficient for the preplanned trip, that 7 of the ten supercapacitor batteries are used, leaving 7 of 10 batteries with usable future charge and 3 of the ten batteries left fully charges in case there is a deviation from the planned trip. The energy optimization 124 could define used in preplanned route optimization or route optimization in many ways, including but not limited to Artificial Intelligence of historical data, historical data on actual use of a common route, etc. Since graphene-based supercapacitors have unique "signatures of performance" based upon pre measurements above that are different than, say, lead-acid batteries or lithium-ion batteries, the unique" signatures of performance" using the energy optimization module 124 will make the driving experience of the EV using the graphene-based supercapacitors to be a least the same if not better experience than if the EV used lead-acid batteries or lithium-ion batteries, that is, less likely to have battery failures, batteries lose power uphill, batteries run out when traveling, in energy optimization module 124.

Further, the base module 122 may comprise a charging module 126, configured to evaluate the charging requirement of each of the plurality of supercapacitor units 108. The charging module 126 is described in conjunction with FIG. 5. In some examples, the charging module 126 may be activated and deactivated automatically by the base module 122 upon receiving a request from the energy optimization module 124 related to the requirement of the electric charge to drive the electric vehicle 102. For example, if there are enough battery units with enough charge for running the EV at certain speeds for a certain amount of time (average power consumption), the charging module 126 is deactivated. If the EV at certain speeds for a certain time (average power consumption) is not available, the charging module 126 is activated. In some examples, the charging module 126 may be configured to retrieve data related to each of the plurality of supercapacitor units 108 from the energy management database 104. In some examples, the data related to each of the plurality of the supercapacitor units 108 may correspond to an amount of electric charge stored in each of the plurality of supercapacitor units 108. In another embodiment, the charging module 126 may be configured to analyze and compare the data retrieved from the energy management database 104 concerning the data related to each of the plurality of supercapacitor units 108. Further, the charging module 126 may determine whether charging is needed or not.

Further, the base module 122 may comprise a maintenance module 128 to maintain the electric vehicle 102. In some examples, the maintenance module 128 may be configured to run internal maintenance of the electric vehicle 102 and the plurality of supercapacitor units 108 after the base module 122 receives a notification from the charging module 126. Further, the maintenance module 128 may determine whether the electric vehicle 102 is consuming the electric charge more than the desired charge for a particular run time, where a maintenance check may be needed. In some examples, the maintenance module 128 may raise a maintenance request to the base module 122, indicating that the plurality of supercapacitor units 108 is not coupled correctly. The electric vehicle 102 is experiencing more load while driving over the predefined path. Further, the maintenance module 128 may determine the performance of the electric vehicle 102 for retrieved performance from the design database 120 and the energy management database 104. In another embodiment, the maintenance module 128 may perform an internal maintenance check-up to determine whether each component of the electric vehicle 102 is functioning up to its desired requirement.

Further, the base module 122 may comprise a speed optimization module 130 configured to provide the predefined path of the electric vehicle 102. The speed optimization module 130 may also be referred to as a range optimization module In some examples. Further, the speed optimization module 130 may enhance the performance of the electric vehicle 102 by minimizing the consumption of electric charge. In some examples, the speed optimization module 130 may be configured to provide a road map for the electric vehicle 102. In some examples, the road map may be a graph or a curve with anticipated acceleration and deceleration points along the predefined path with areas where the drain is used and where it is not (hills drain batteries a lot and valleys drain the battery less). Therefore, the electric vehicle 102 may consume electric charge only when accelerating over a steep curve and may stop the flow of the electric charge while moving downwards on a steep curve. Further, the speed optimization module 130 may retrieve information related to maintenance of the electric vehicle 102 from the design database 120 to measure the amount of electric charge consumed by the electric vehicle 102 before maintenance.

Further, the base module 122 may comprise a control module 132 configured to determine the best use of the electric charge from the plurality of supercapacitor units 108. In some examples, the controller module 132 may be configured to retrieve information related to the ideal consumption of the electric charge of the electric vehicle 102 from the energy management database 104. Further, the controller module 132 may use information from the energy optimization module 124, the charging module 126, the maintenance module 128, and the speed optimization module 130 to determine the best use of the electric charge. For example, the controller module 132 retrieves from the energy management database 104 that the electric vehicle 102 should consume 3 kWh per kilometer of electric charge. However, the maintenance module 128 and the speed optimization module 130 provide information that the electric vehicle 102 is consuming 4 kWh per kilometer of electric charge. Therefore, the controller module 132, using the anticipated acceleration and deceleration map, can determine the best use of the electric charge to manage overall watt-hour energy over time. Further, the controller module 132 may be configured to effectively manage the plurality of supercapacitor units 108 in series or parallel. In some examples, the base module 122 may comprise a communication module 134 configured to facilitate communication between the base module 122 and the plurality of supercapacitor units 108. Further, the base module 122 may determine the number of supercapacitor units being used in the electric vehicle 102 in real-time. In some examples, the communication module 134 may be configured to provide an exact figure for connections of the supercapacitor units 108 for the plurality of supercapacitor units 108, which continuously supply electric charge to the electric vehicle 102.

Further, the base module 122 may comprise a health and safety module 136 and a security module 138. The health and safety module 136 may be configured to provide health and safety-related to the user related to the safety of the battery (danger of fire or explosion) of the electric vehicle 102. For example, 102 experiences health-related problems while driving the electric vehicle, such as batteries getting near and an over-temperature setting, which can be displayed using the display interface 114. Further, the electric vehicle 102 may be provided with the security module 138 to measure continuously the plurality of supercapacitor units 108 installed within the electric vehicle 102. The security module 138 may also evaluate and warn users how external charging hookups may be configured. Communications module 134 covers internal messaging and control data internally to the system 100 and messaging to the user using the display interface 114. Further, the base module 122 may comprise a health and safety module 136. The health and safety module 136 may be configured to provide health and safety-related to the user related to the safety of the battery (danger of fire or explosion) of the electric vehicle 102.

Further, the electric vehicle 102 may be provided with the security module 138 to measure continuously the plurality of supercapacitor units 108 installed within the electric vehicle 102. The security module 138 may also evaluate and warn users how external charging hookups may be configured. Further, the base module 122 may comprise a motor control module 140 to enhance the performance of the vehicle motor of the electric vehicle 102. In some examples, the motor control module 140 may be configured to evaluate the performance of the vehicle motor in at least two modes. The two modes may be enhanced torque and economy modes In some examples. Further, the enhanced torque mode may be employed when the electric vehicle 102 moves up a hill or the steep curve of the road upwards. In some examples, the motor consumes more electric charge to generate more torque for moving the electric vehicle 102 upwards. Further, the economy mode may be initiated when the electric vehicle 102 moves down the hill. The less electric charge needs to drive the electric vehicle 102 downwards or when the electric vehicle 102 is extending beyond the run time. In some examples, the motor control module 140 may be configured to monitor and anticipate the performance of the motor according to the enhanced torque mode or the economy mode. Further, the motor control module 140 may retrieve data related to parameters affecting the movement of the electric vehicle 102 over the path from the energy management database 104 and the design database 120. In some examples, the data may include but is not limited to weather, length of the day, length of an area (e.g., golf course), and the like.

Further, the Solar Control Module 142 will control aspects of solar charging supercapacitor units 108, based upon geolocation predictions, shade detection, and other factors. The Solar Charge Module 142 will also deliver alerts to the user. Further, the Solar Database 144 allows for storing and reading all solar data by timestamp, including but not limited to (1) geolocation data, (2) shade data, (3) solar energy output data, (4) initiative authority of if its OK to charge, supercapacitor units 108 charging data, etc. Further, the Solar Hardware Controller 146 connects to Solar Module 148, polls Solar Cells for energy output, sends all data to Solar Database 144, and then loops in not interrupted or returns to Base Module 122. Further, the Solar Module 148 is always locally executing and will receive and send data to the Solar Hardware Controller 146. The Solar Module 148 polls the Solar Hardware Controller 146, and if requested, the Solar Module 148 will send data to Solar Hardware Module 146 and or if requested, the Solar Module 148 will send charge data to Charging Module 126 and or if requested, the Solar Module 148 will charge supercapacitor units 108. Further, the Solar Charging Module checks to see if charging the supercapacitor units 108. The Charging Module 126 of Base Module 122 integrates the Solar Charging Module 150 to allow solar cell charging into its process (not shown). The Charging Module 126 commands the solar module 148 to connect to supercapacitor units 108 to charge the supercapacitor units 108. This happens when the predicted GEO Location, sun-times, and intensity are adequate, and no shade is blocking the solar cells. It should be noted that there are many reasons as to why the solar module 148 does not just continually charge the supercapacitor units 108, for example, but not limited to (1) the design of the lifetime of supercapacitors can be optimized for solar cell charging with the correct intensity and time of solar charging, (2) managing solar cell charging properly may make the prediction systems of the Electric Vehicles 102 to be improved (improved energy optimization, improved maintenance, improved speed optimization, improved health and safety (not to overcharge the supercapacitor units 108) and (3) assisting the user to understand how sun and shade can affect charging so the user may optimize their driving behaviors, at Solar Charging Module 150.

Further, the Geo Location Module 152 reads the Geolocation from Electric Vehicle 102 GPS (not shown), then inputs the Geolocation data to Charge Map Module (not shown) to determine if it is OK to charge supercapacitor units 108. Further, the Shade Module 154 executes from Geo Location Module 152 then read the Shade Level. Any of several means determines the Shade level. For instance, since the Shade Module, 154 was called by the GEO Location Module 152, there should be enough sun intensity to charge the supercapacitors. However, there could be clouds blocking sunlight. The user could have parked the Electric Vehicle in a shady location. The Shade Module 154 may determine that shade (defined as all solar cells reduced in intensity by 50%) could be determined as shade. On the other hand, in some embodiments, shade may be determined as any of (1) solar cells' energy fluctuations, or (2) some solar cells blocked and some solar cells not blocked. The Shade Module 154 will determine if there is too much shade to charge the supercapacitor unit 108. The Shade Module 154 then determines if it is OK to charge the supercapacitor unit 108. Self Discharge Module 156 inputs all data from Design Database 120 and extracts Historical Self Discharge rates from Design Database 120. Energy change is measured to calculate the most recent discharge rate; the rate is converted to a 24-hour rate. Self Discharge Module 156 calculates the updated self-discharge rate by comparing the Historical self-discharge rate to the most recent and calculating the updated self-discharge rate. Predicted Load Module 158 determines If there is a predicted charge time. For example, suppose the vehicle has not been used for 1 hour, and historical use data (not shown) shows the electric vehicle is not likely to be used. In that case, an "OK to trickle charge" command is written to solar database 144 for later determination of activating trickle charger 162, at Predicted Load Module 158. Trickle Load Module 160 determines if It is OK to trickle charge supercapacitor Units 108. A trickle charger refers to a supercapacitor battery charger (that is powered by solar cells (not shown)) that charges at low amperage. The trickle charger 162 connects (not shown) the solar cells' power to then provide power to the supercapacitor units 108. The trickle charger 162 is connected to processor 116 to execute commands from trickle load module 160 to be activated on/off. Trickle charger 162 puts out a variety of amperages to charge a battery slowly or quickly depending on the need. The trickle charger is designed to be left connected long-term without overcharging. The trickle charger 162 is turned off when the electric vehicle is back in use (not shown), at operation 1002.

Figure 2:
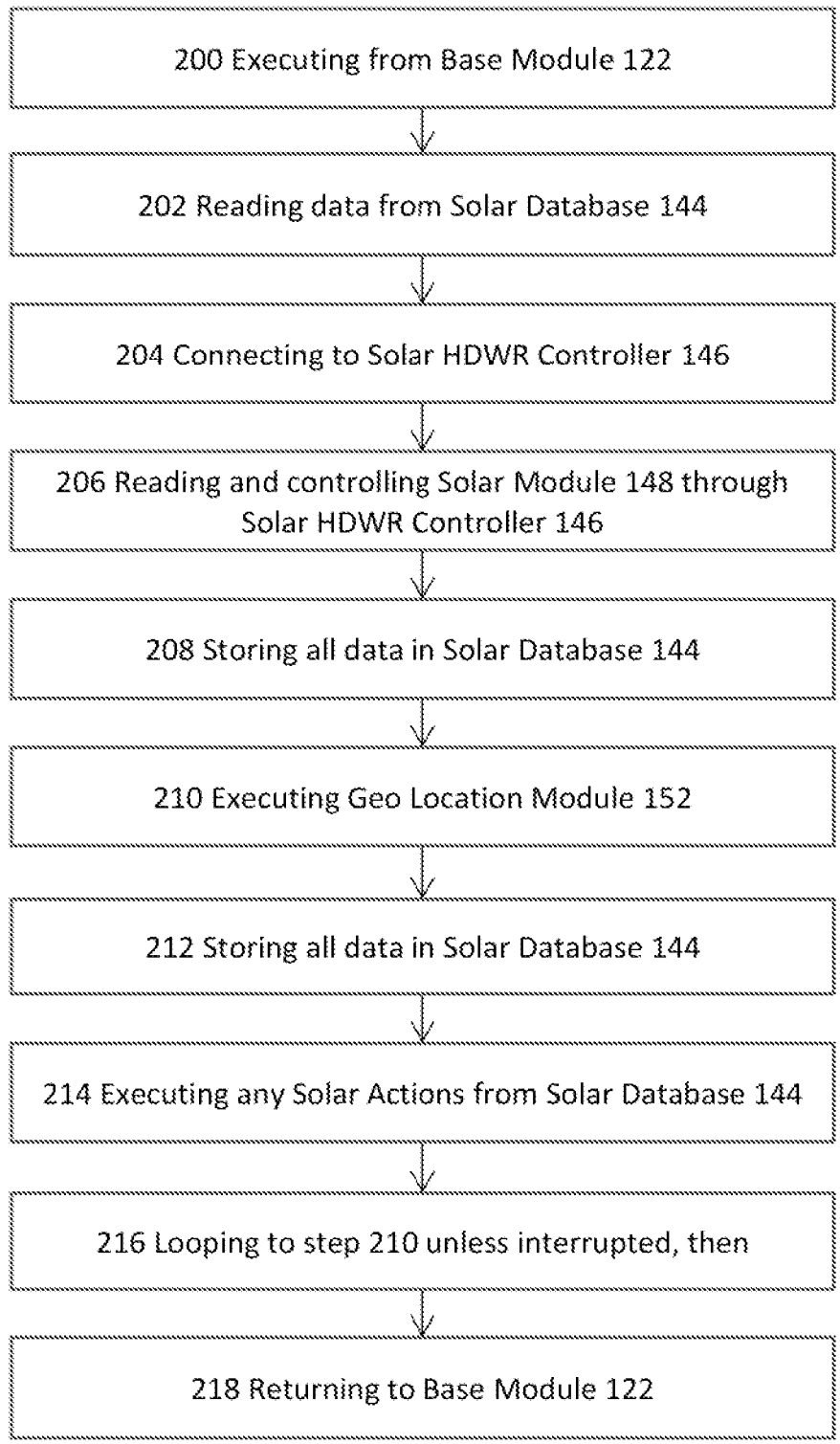
FIG. 2 is a flow diagram illustrating a process performed using a Solar Control Module, according to some examples.

FIG. 2 is a flow diagram illustrating a process 250 performed using a Solar Control Module 142. The process 250 can begin with the solar control model 142 executing from Base Module 122. The Solar Control Module 142 will control all aspects of solar charging supercapacitor units 108, based upon geolocation predictions, shade detection, and other factors. The Solar Charge Module 142 will also deliver alerts to the user if needed at operation 200. The process reads data from Solar Database 144 (not shown). The Solar Database 144 allows for storing and reading all solar data by timestamp, including but not limited to (1) geolocation data, (2) shade data, (3) solar energy output data, (4) initiation authority of if it is OK to charge, supercapacitor units 108 charging data, etc. at operation 202. The process then connects the Solar Control Module 142 to the Solar Hardware Controller 146. This connection allows the Solar Control Module 142 to control (read and write data) to the Solar Hardware Controller 146 at operation 204. The process then reads and controls the Solar Module 148 through Solar Hardware Controller 146, at operation 206. The process then stores all current data into the Solar Database 144, at operation 208. The process executes the Geo Location Module 152 at operation 210. The process then stores all current data into Solar Database 144, at operation 212. The process executes any Solar Actions from Solar Database 144. For example, alerts can be created in the Solar database to tell the user about solar charging conditions during the solar charging process. For example, the Solar Database 144 may contain an action to display that the shade prevents charging using the display interface 114. For an additional example, the Solar Database 144 may contain an action to alert the user on the display interface 114 that the solar cells will be charging the supercapacitor units 108 for the next two hours, at operation 214. The process then loops back to operation 210 unless interrupted. By looping is meant to return control to an earlier operation. It should be noted that looping could loop back either in real-time or on a timed interval, at operation 216. The process then returns to the Base Module 122, at operation 218.

Figure 3:
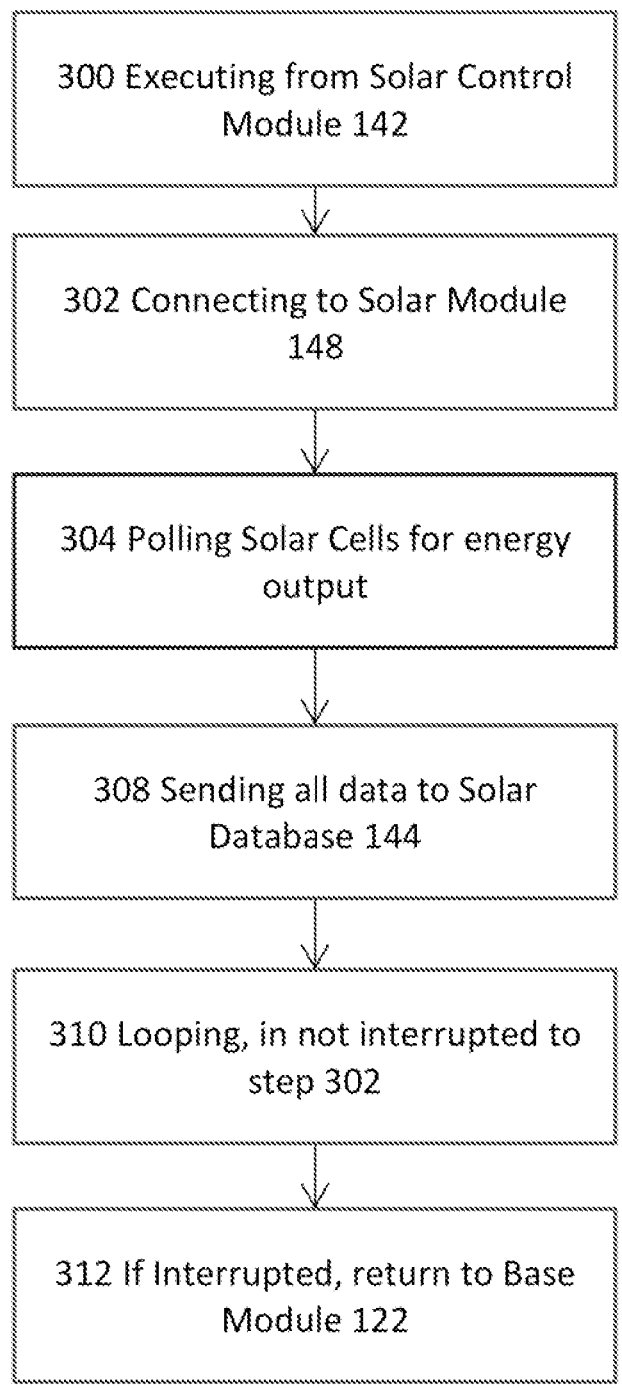
FIG. 3 is a flow diagram illustrating a process performed using a Solar Hardware Controller, according to some examples.

FIG. 3 is a flow diagram illustrating a process 350 performed using a Solar Hardware (HDWR) Controller 146. The process 350 can begin with the Solar Hardware Module 146 executing from Solar Control Module 142, at operation 300. The process then connects to Solar Module 148, at operation 302. The process polls the Solar Cells for energy output. For example, the Solar cells mounted on the Electric Vehicle 102 may have a panel or set of panels where each panel may have multiple solar cells. Some solar cells may not read any out energy as there could be no sun out or blocked solar cells. This information is valuable to determine the following actions of charging supercapacitor units 108, at operation 304—the process then stores all data to Solar Database 144, at operation 306. The process then loops, not interrupted to operation 302. By looping, it is meant to return control to an earlier operation. It should be noted that looping could loop back either in real-time or on a timed interval, at operation 308. The process, if Interrupted, return to Base Module 122, at operation 310.

Figure 4:
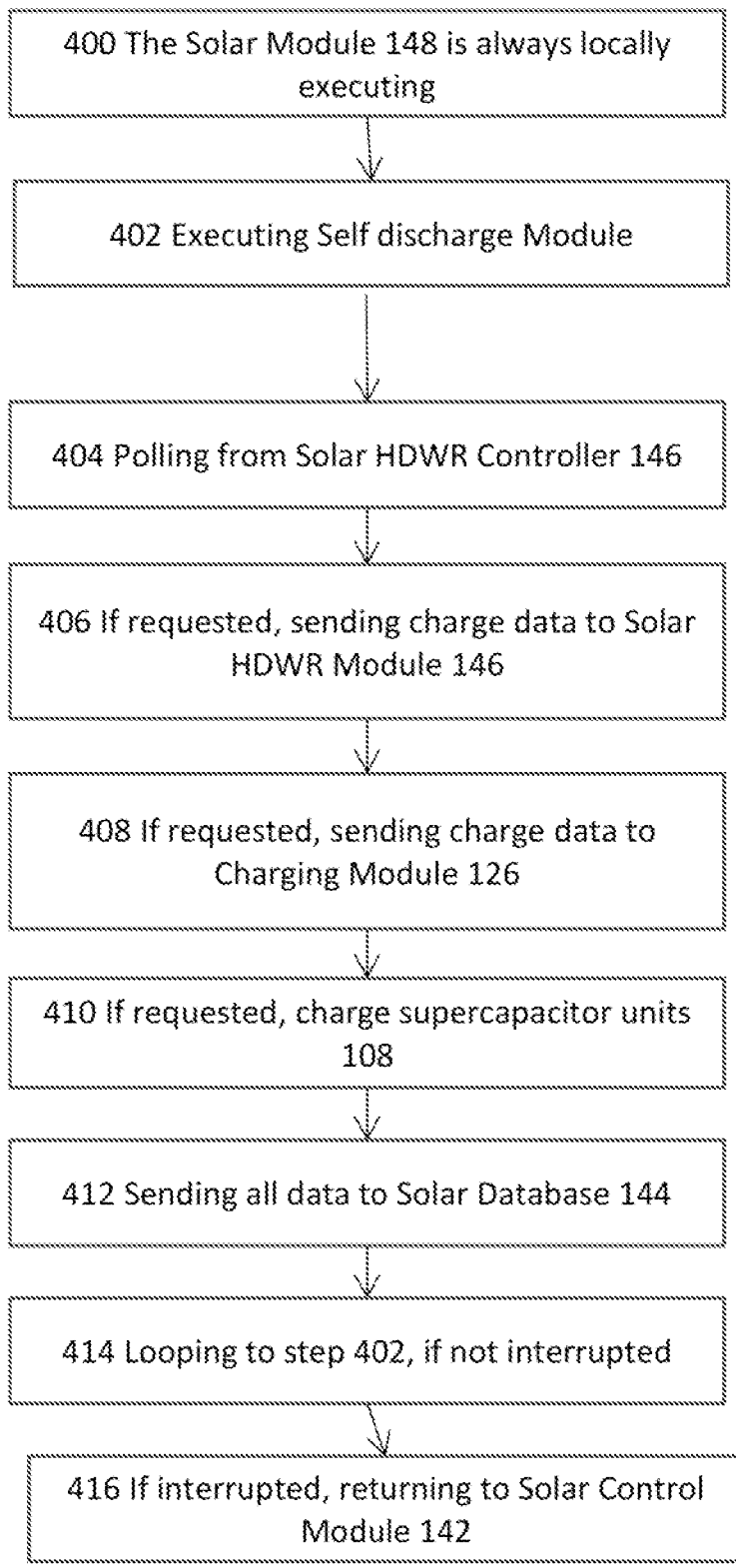
FIG. 4 is a flow diagram illustrating a process performed using a Solar Module, according to some examples.

FIG. 4 is a flow diagram illustrating a process 450 performed using a Solar Module 148. The process 450 can begin with the solar module 148 being locally executed. The Solar Module 148 will receive and send data to the Solar Hardware Controller 146 at operation 400. The Solar Module 148 executes the Self-discharge Module 156 at operation 402. The process then polls the Solar Hardware Controller 146 at operation 404. If requested, the Solar Module 148 will send data to Solar Hardware Module 146 at operation 406. If requested, the Solar Module 148 will send charge data to Charging Module 126 at operation 408. If requested, the Solar Module 148 will charge supercapacitor units 108. at operation 410. The Solar Module 148 will send all data to Solar Database 144, at operation 412. The process then loops back to operation 404, if not interrupted. Looping is meant to return control to an earlier operation.

It should be noted that looping could loop back either in real-time or on a timed interval, at operation 414. If interrupted, the process returns to Solar Control Module 142. Interruption may be, for example, that other processes of the base module 122 take precedent. If interrupted, it is understood that base module 122 can reinitiate any process related to solar cell charging (not shown) at operation 416.

Figure 5:
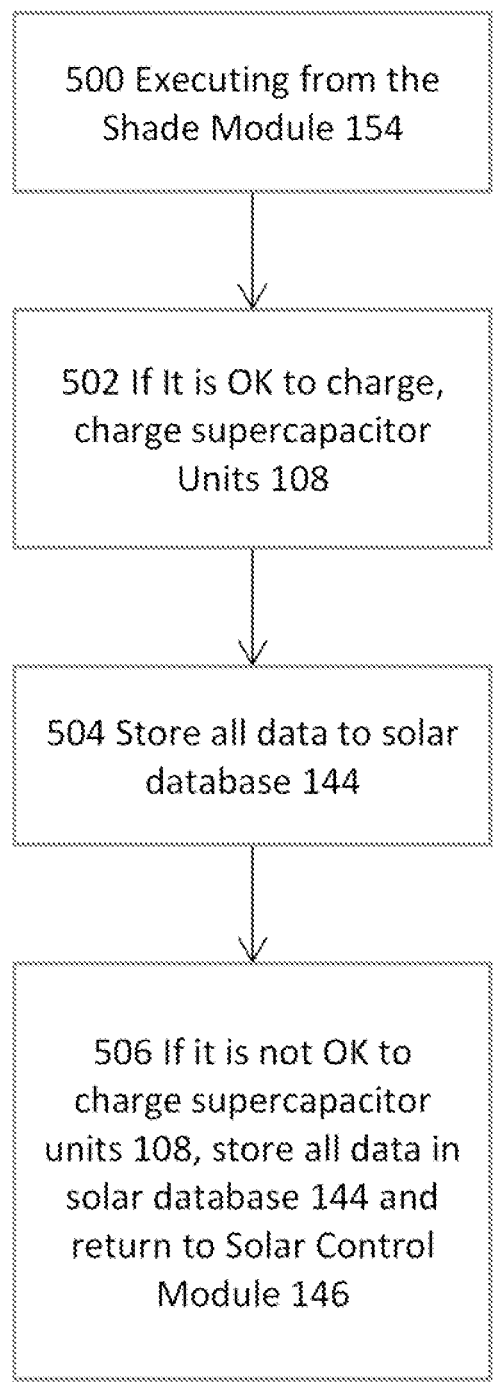
FIG. 5 is a flow diagram illustrating a process performed using a Solar Charging module, according to some examples.

FIG. 5 is a flow diagram illustrating a process 550 performed using a Solar Charging module 150. The process 550 can begin with the Solar Charging Module 150 being executed from the Shade Module 154. The Solar Charging Module 150 checks to see if it is OK to charge the supercapacitor units 108. The Charging Module 126 of Base Module 122 integrates the Solar Charging Module 150 to allow solar cell charging into its process (not shown). The Charging Module 126 commands the solar module 148 to connect to supercapacitor units 108 to charge the supercapacitor units 108. This happens when the predicted GEO Location, sun-times, and intensity are adequate, and no shade is blocking the solar cells.

It should be noted that there are many reasons as to why the solar module 148 does not just continually charge the supercapacitor units 108, for example, but not limited to (1) the design of the lifetime of supercapacitors can be optimized for solar cell charging with the correct intensity and time of solar charging, (2) managing solar cell charging correctly may make the prediction systems of the Electric Vehicles 102 to be improved (improved energy optimization, improved maintenance, improved speed optimization, improved health and safety (not to overcharge the supercapacitor units 108) and (3) assisting the user to understand how sun and shade can affect charging so the user may optimize their driving behaviors, at operation 500. Further, the Charging Module 126 of Base Module 122 integrates the Solar Charging Module 150 to allow solar cell charging into its process (not shown). The Charging Module 126 commands the solar module 148 to connect to supercapacitor units 108 to charge the supercapacitor units 108. This happens when the predicted GEO Location, sun-times, and intensity are adequate, and no shade is blocking the solar cells. It should be noted that there are many reasons as to why the solar module 148 does not just continually charge the supercapacitor units 108, for example, but not limited to (1) the design of the lifetime of supercapacitors can be optimized for solar cell charging with the correct intensity and time of solar charging, (2) managing solar cell charging correctly may make the prediction systems of the Electric Vehicles 102 to be improved (improved energy optimization, improved maintenance, improved speed optimization, improved health and safety (not to overcharge the supercapacitor units 108) and (3) assisting the user to understand how sun and shade can affect charging so the user may optimize their driving behaviors, at operation 502. The Solar Charging Module 150 stores all data to the Solar Database 144, at operation 504. The Solar Charging Module 150 determines If it is not OK to charge supercapacitor units 108. If so, the Storage Charging Module 150 stores all data in solar database 144 and returns control to the Solar Control Module 146, at operation 506.

Figure 6:
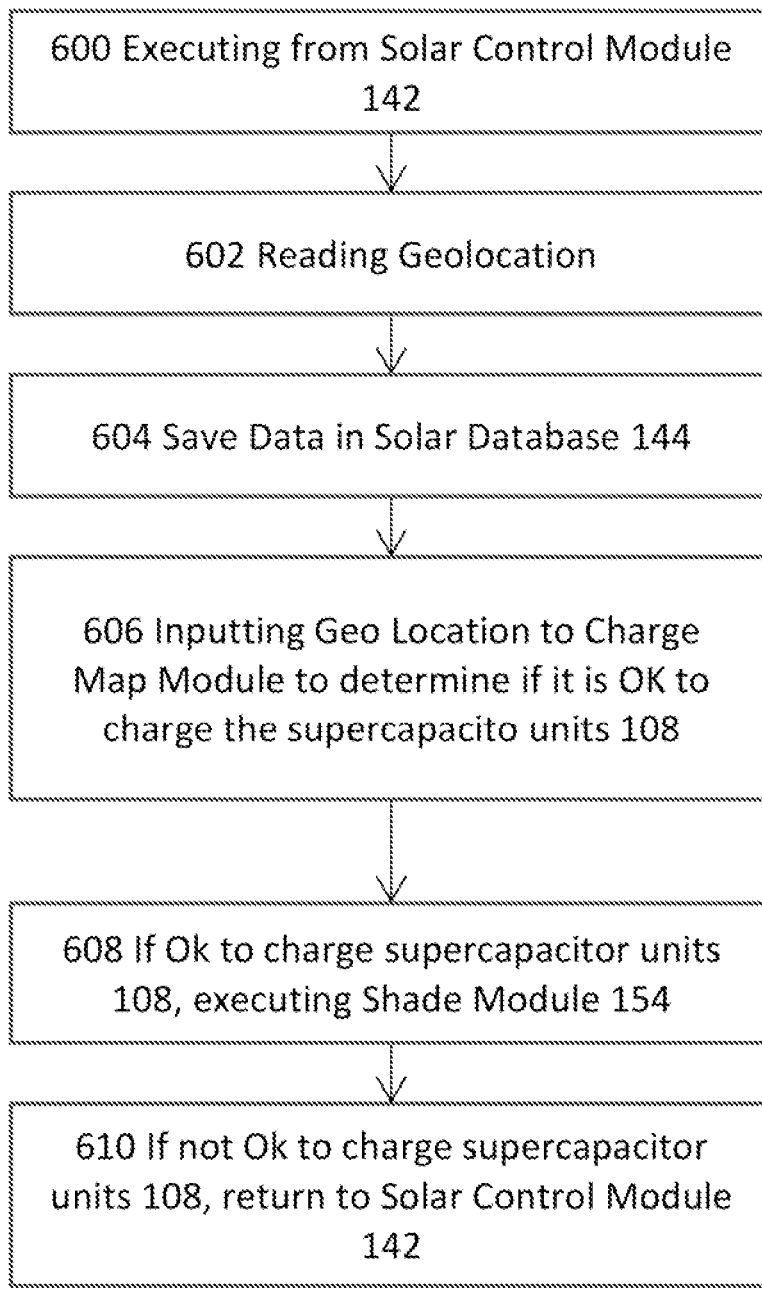
FIG. 6 is a flow diagram illustrating a process performed using a GEO Location Module, according to some examples.

FIG. 6 is a flow diagram illustrating a process 650 performed using a GEO Location Module 152. The Geo Location Module 152 executes from the Solar Control Module 142, at operation 600. The Geo-Location Module 152 reads the Geolocation from Electric Vehicle 102 GPS (not shown) at operation 602. the Geo Location Module 152 save all data to the Solar Database 144, at operation 604. The Geo-Location Module 152 then inputs Geo-Location data to Charge Map Module (not shown). The Charge Map Module determines if it is OK to charge supercapacitor units 108. For example, the charge Map Module will read the forecasted weather (not shown) to determine if the sun is projected to be out and its projected sunlight intensity. For example, if the sun will be out for the next 2 hours and the sun intensity is strong, it is OK to charge the supercapacitor unit 108. In some embodiments, charging the supercapacitors for 2 hours may be enough to supply enough energy to run the Electric Vehicle 102 and fully charge the supercapacitor unit 108. If it is determined that there is not enough sun time or intensity to charge the supercapacitor units 108, then an action to alert the user on the display interface 114. The Charge Map Module may determine other times to charge the supercapacitor units 108, for example, at various predicted time intervals, various times of the day, etc., at operation 606. The Geo-Location Module 152 determines if it is OK to charge supercapacitor units 108; if so, it executes the Shade Module 154 at operation 608. The Geo-Location Module 152 determines if it is not OK to charge supercapacitor units 108; if so, the process returns to the Solar Control Module 142, at operation 610.

Figure 7:
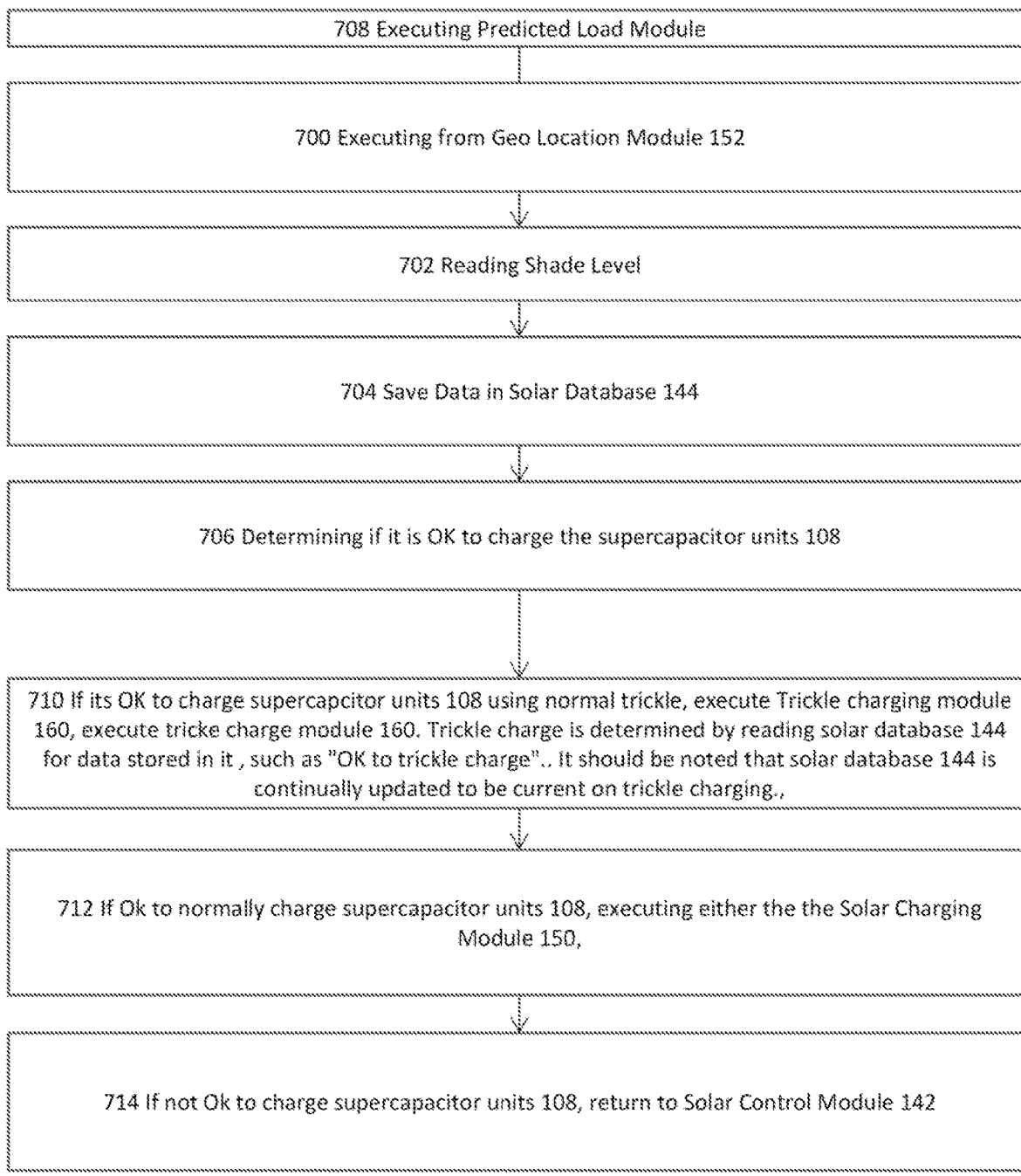
FIG. 7 is a flow diagram illustrating a process performed using a Shade Module, according to some examples.

FIG. 7 is a flow diagram illustrating a process performed using a Shade Module 154. The Shade Module 154 executes from Geo Location Module 152, at operation 700. The Shade Module 154 then read the Shade Level. Any of some means determines the Shade level. For instance, since the Shade Module, 154 was called by the GEO Location Module 152, there should be enough sun intensity to charge the supercapacitors. However, clouds could block sunlight, and the user could have parked the Electric Vehicle in a shady location. The Shade Module 154 may determine that shade (defined as all solar cells reduced in intensity by 50%) could be determined as shade.

On the other hand, in some embodiments, shade may be determined as any of (1) solar cells' energy fluctuations, or (2) some solar cells blocked and some solar cells not blocked. The Shade Module 154 will determine if there is too much shade to charge the supercapacitor unit 108 at operation 702. The Shade Module 154 saves the Data in Solar Database 144, at operation 704. The Shade Module 154 then determines if it is OK to charge the supercapacitor unit 108 at operation 706. The Shade Module 154 then determines if it is OK to charge supercapacitor units 108; if it is OK, the Shade Module 154 then executes the Predicted Load Module 158 at operation 708. The Shade Module 154 then determines If it's OK to charge supercapacitor units 108 using normal trickle, execute Trickle charging module 160, execute trickle charge module 160. Trickle charge is determined by reading solar database 144 for data stored in it, such as "OK to trickle charge."

It should be noted that solar database 144 is continually updated to be current on trickle charging at operation 710. The Shade Module 154 then determines if it is OK to normally (not trickle) charge supercapacitor units 108; if it is OK, the Shade Module 154 then executes the Solar Charging Module 150 at operation 712. The Shade Module 154 then determines If it is not OK to charge supercapacitor units 108; if it is not OK to charge the supercapacitor units 108, the Shade Module 154 then returns to Solar Control Module 142, at operation 714.

Figure 8:
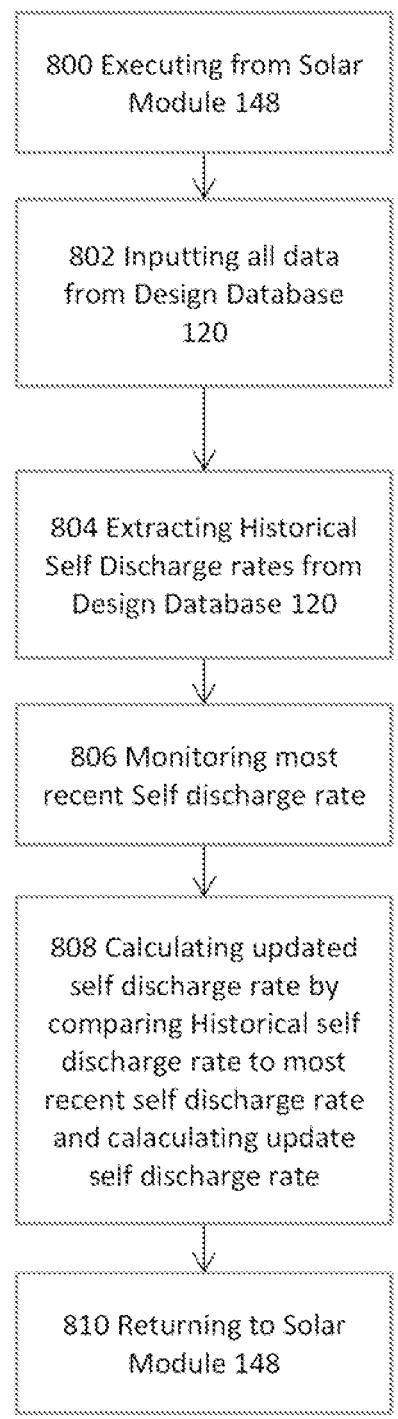
FIG. 8 is a flow diagram illustrating a process performed using a Self Discharge Module, according to some examples.

FIG. 8 is a flow diagram illustrating a process 850 performed using a Self Discharge Module 156. The process 850 can begin with Self Discharge Module 156 executing from the Solar Module 148, at operation 800. Self Discharge Module 156 inputs all data from Design Database 120, at operation 802. Self Discharge Module 156 extracts Historical Self Discharge rates from Design Database 120; the discharge rate of supercapacitors is 20 percent of their charge per day due to self-discharge, at operation 804. Self Discharge Module 156 monitors the most recent Self-discharge rate. For example, when the supercapacitor is not being used by the electric vehicle, charging is suspended for 1 hour. Energy change is measured to calculate the most recent discharge rate; the rate is converted to a 24-hour rate. This data is stored in the design database at operation 806. Self Discharge Module 156 calculates the updated self-discharge rate by comparing the Historical self-discharge rate to the most recent self-discharge rate and calculating the updated self-discharge rate. For example, if the most recent self-discharge rate is 25% per day and the Historical self-discharge rate is 20%, an average of the two is calculated (22.5% self-discharge rate) and stored in the Design database the most recent self-discharge rate. Using an average may eliminate worst-case changes of a supercapacitor over time as previous charging times and charging amounts could be varied.

It should be noted that other ways to calculate the most recent self-discharge rates, for example, using the most recent self-discharge rate as the update self-discharge rate if the difference between the historical discharge rate and most recent self-discharge rate is more significant than, say, 10% difference. The most recent self-discharge rate would be used to calculate the trickle charge time of the supercapacitor units. Trickle charges employ a battery regulator to regulate the charging rate and prevent overcharging, charging the supercapacitor unit 108 at a rate similar to the rate at which it self-discharges to maintain total battery capacity. Charging at too fast of a rate or overcharging can cause damage to the battery at operation 808. Self Discharge Module 156 returns to Solar Module 148, at operation 810.

Figure 9:
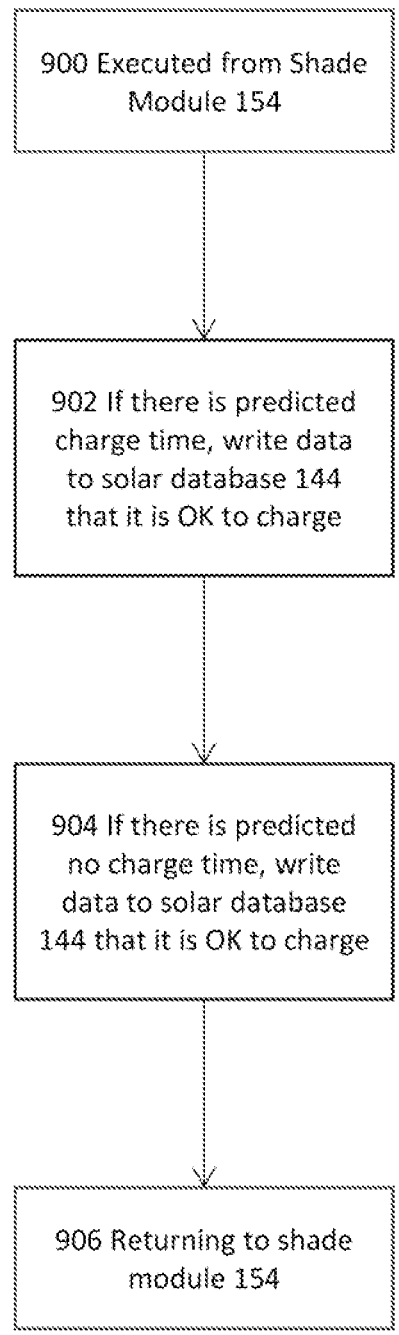
FIG. 9 is a flow diagram illustrating a process performed using a Predicted Load Module, according to some examples.

FIG. 9 is a flow diagram illustrating a process 950 performed using a Predicted Load Module 158. The process 950 can begin with Predicted Load Module 158 executing from Shade Module 154, at operation 900. Predicted Load Module 158 determines If there is predicted charge time, write data to solar database 144 that it is OK to charge. For example, if the vehicle has not been used for 1 hour and historical use data (not shown) shows the electric vehicle is not likely to be used, an "OK to trickle charge" command is written to solar database 144. There could be many many ways to predict from historical use data (saved in solar database 144), for the prediction of use, for example, (1) a calendar system could be accessed for golfer schedules or (2) prediction of use could be determined based upon weather, where rain is likely, so it's unlikely that golfers will play, etc., at operation 902. If there is no charge time predicted, write data to solar database 144 that it is "not OK to trickle charge" at operation 904. Predicted Load Module 158 the returns to shade module 154 at operation 906.

Figure 10:
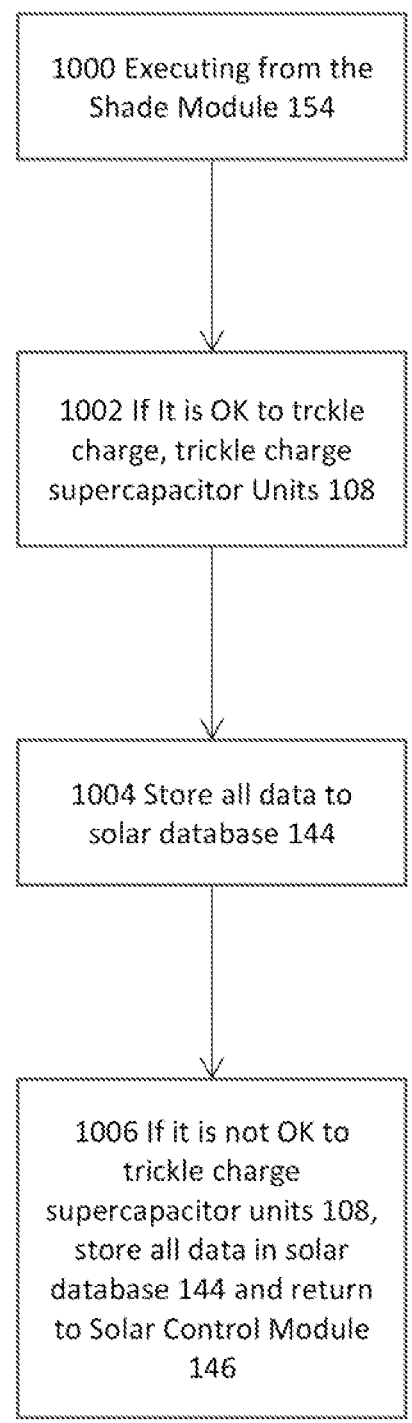
FIG. 10 is a flow diagram illustrating a process performed using a Trickle Load Module, according to some examples.

FIG. 10 is a flow diagram illustrating a process 1050 performed using a Trickle Load Module. The Trickle Load Module 160 can execute from the Shade Module 154, at operation 1000. Trickle Load Module 160 determines if It is OK to trickle charge supercapacitor Units 108. For example, trickle charging refers to a supercapacitor battery charger (that is powered by solar cells) that charges at low amperage. The trickle charger 162 connects (not shown) the solar cells' power to then provide power to the supercapacitor units 108. The trickle charger 162 is connected to processor 116 to execute commands from trickle load module 160 to be activated on/off. Trickle charger 162 puts out a variety of amperages to charge a battery slowly or quickly depending on the need. The trickle charger is designed to be left connected long-term without overcharging. The trickle charger is turned off when the electric vehicle is back in use (not shown), at operation 1002. In some embodiments, trickle charging can be further integrated or optimized with data from batteries lifetime, maintenance, speed optimization, energy optimization, and safety concerns. Trickle Load Module 160 stores all data to solar database 144, at operation 1004. If it is not OK to trickle charge supercapacitor units 108, store all data in solar database 144 and return to Solar Control Module 146 at operation 1006.

Figure 11:
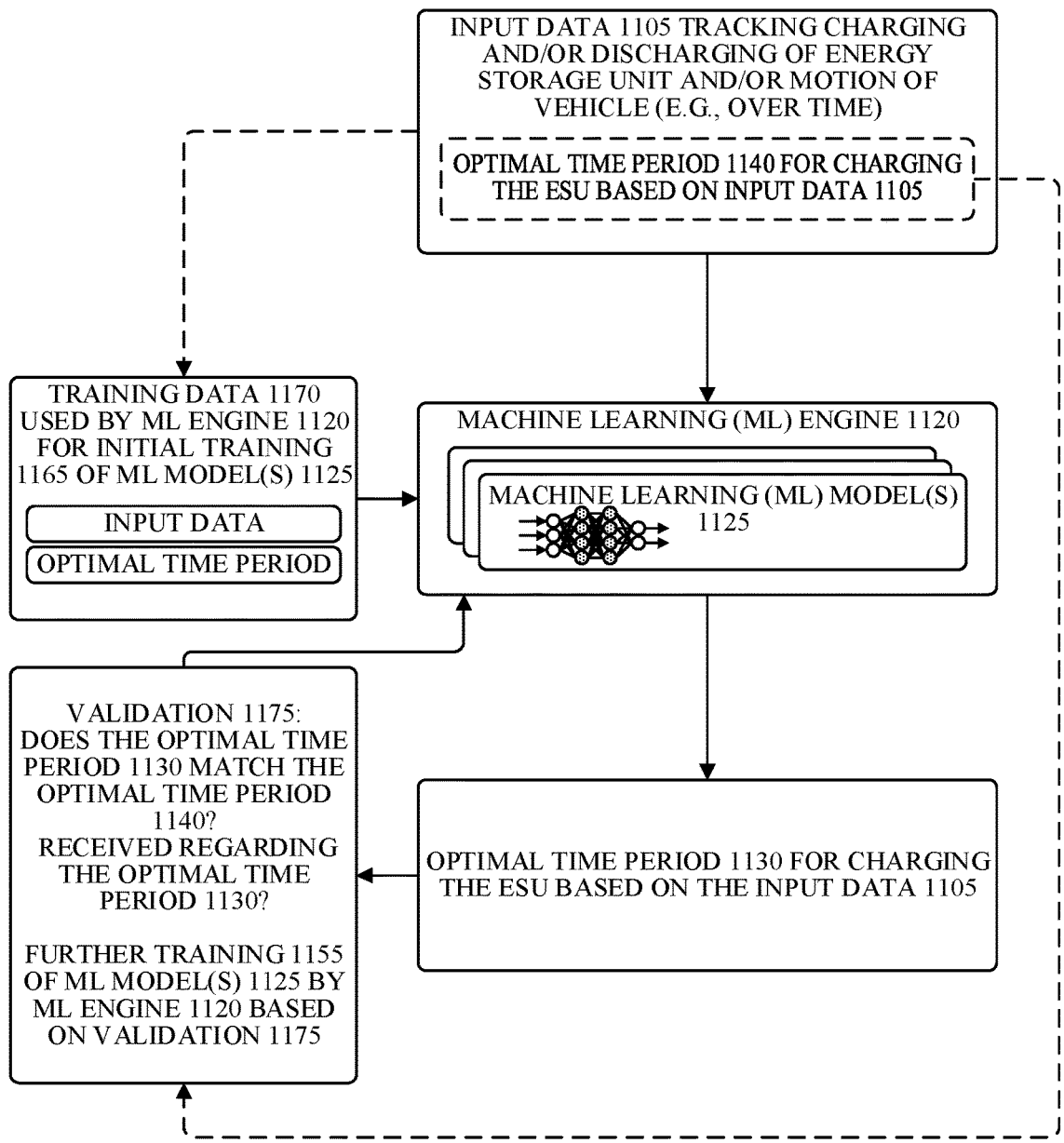
FIG. 11 is a block diagram illustrating use of one or more trained machine learning models of a machine learning engine to predict an optimal time period to charge an energy storage unit, according to some examples.

FIG. 11 is a block diagram 1100 illustrating use of one or more trained machine learning models 1125 of a machine learning engine 1120 to predict an optimal time period 1130 to charge an energy storage unit. The ML engine 1120 and/or the ML model(s) 1125 can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more classifiers, one or more transformers, or combinations thereof. Within FIG. 11, a graphic representing the trained ML model(s) 1125 illustrates a set of circles connected to another. Each of the circles can represent a node, a neuron, a perceptron, a layer, a portion thereof, or a combination thereof. The circles are arranged in columns. The leftmost column of white circles represent an input layer. The rightmost column of white circles represent an output layer. Two columns of shaded circled between the leftmost column of white circles and the rightmost column of white circles each represent hidden layers. The ML engine 1120 and/or the ML model(s) 1125 can be part of the AI/ML module 182.

Once trained via initial training 1165, the one or more ML models 1125 receive, as an input, input data 1105 that identifies attribute(s) of charging and/or discharging of an energy storage unit (ESU) (e.g., type, voltage, discharge curve, capacitance, impedance, current, amperage, capacity, energy density, specific energy density, power density, temperature, temperature dependence, service life, physical attributes, charge cycle, discharge cycle, cycle life, deep discharge ability, discharge rate, charge rate, and the like) and/or attribute(s) of motion of a vehicle (e.g., mileage, efficiency, ergonomics, aerodynamics, shape, geometry, weight, horsepower, brake power, turning radius, type, size, energy consumption rate, location, speed, velocity, acceleration, deceleration, turning radius, and the like). At least some of the input data 1105 may be received from one or more sensors, such as sensors to measure voltage, current, resistance, capacitance, inductance, frequency, power, temperature, continuity, location, motion, acceleration, deceleration, orientation, changes to any of these attributes, or a combination thereof. In some examples, the one or more sensors can include one or more voltmeters, ammeters, ohmmeters, capacimeters, inductance meters, wattmeters, thermometers, thermistors, multimeters, accelerometers, gyrometers, gyroscopes, global navigation satellite system (GNSS) receivers, inertial measurement units (IMUs), or a combination thereof. In some examples, the input data 1105 may be received from a design database 120 and/or the solar database 144, where at least some of the input data 1105 may be stored after measurement by the sensors. In some examples, the input data 1105 can also include information that is indicative of total capacity of the ESU, the remaining charge and/or remaining capacity of the ESU, a level of shade or shadows that could prevent solar cells from generating charge from light (e.g., whether or not shade or shadows are blocking solar cells to prevent solar charging), a route of the vehicle, a schedule trip of the vehicle, elevation data indicative of uphill and/or downhill portions of a route of the vehicle, or a combination thereof. In some examples, for instance during validation 1175, the ML engine 1120 and/or the one or more ML models 1125 can also receive, as an additional input, a predetermined optimal time period 1140 for charging the ESU that is based on (or otherwise corresponds to) the input data 1105. In some examples, for instance during validation 1175, the ML engine 1120 and/or the one or more ML models 1125 can also receive, as an additional input, a predetermined range 1145 of the vehicle that is based on (or otherwise corresponds to) the input data 1105 and/or the predetermined optimal time period 1140. In response to receiving at least the input data 1105 as an input(s), the one or more ML model(s) 1125 estimate the optimal time period 1130 for charging the ESU based on the input data 1105. The optimal time period 1130 for charging the ESU can indicate a date, a day of the week (e.g., Sunday, Monday, Tuesday, Wednesday, Thursday, Friday, and/or Saturday), a time of day (e.g., morning, afternoon, evening, night, and/or a specific range of hours and/or minutes), a range of times (e.g., between time A on date X and time B on date X, between time A on date X and time B on date Y), or a combination thereof. The optimal time period 1130 for charging the ESU can be based on and/or indicative of a total capacity of the ESU, the remaining charge and/or remaining capacity of the ESU, a level of shade or shadows that could prevent solar cells from generating charge from light (e.g., whether or not shade or shadows are blocking solar cells to prevent solar charging), a route of the vehicle, a schedule trip of the vehicle, elevation data indicative of uphill and/or downhill portions of a route of the vehicle, or a combination thereof.

Estimating the optimal time period 1130 can correspond to at least operations 502, 506, 606, 608, 610, 706, 710, 712, 714, 808, 902, 904, 1002, 1004, 1006, and/or 1210. It should be understood that the pre-determined optimal time period 1140 can likewise include any of the types of capacity and/or range data listed above with respect to the optimal time period 1130.

Once the one or more ML models 1125 generate the optimal time period 1130, the optimal time period 1130 can be output to an output interface that can indicate the optimal time period 1130 to a user (e.g., by displaying the optimal time period 1130 or playing audio indicative of the optimal time period 1130) and/or to the vehicle, which can adjust settings and/or configurations for charging the ESU of the vehicle based on the optimal time period 1130, for instance to only charge the ESU during the optimal time period 1130, to avoid charging outside of the optimal time period 1130, to prioritize charging the ESU during the optimal time period 1130, to deprioritize charging the ESU during the optimal time period 1130, or a combination thereof.

Before using the one or more ML models 1125 to generate the optimal time period 1130 the ML engine 1120 performs initial training 1165 of the one or more ML models 1125 using training data 1170. The training data 1170 can include examples of input data concerning charging and/or discharging and/or vehicle motion attributes (e.g., as in the input data 1105) and/or examples of a pre-determined optimal time period (e.g., as in the pre-determined optimal time period 1140). In some examples, the pre-determined optimal time period in the training data 1170 are optimal time period(s) that the one or more ML models 1125 previously generated based on the input data in the training data 1170. In the initial training 1165, the ML engine 1120 can form connections and/or weights based on the training data 1170, for instance between nodes of a neural network or another form of neural network. For instance, in the initial training 1165, the ML engine 1120 can be trained to output the pre-determined optimal time period in the training data 1170 in response to receipt of the corresponding input data in the training data 1170.

During a validation 1175 of the initial training 1165 (and/or further training 1155), the input data 1105 (and/or the exemplary input data in the training data 1170) is input into the one or more ML models 1125 to generate an optimal time period 1130 as described above. The ML engine 1120 performs validation 1175 at least in part by determining whether the generated optimal time period 1130 matches the pre-determined optimal time period 1140 (and/or the pre-determined optimal time period in the training data 1170). If the optimal time period 1130 matches the pre-determined optimal time period 1140 during validation 1175, then the ML engine 1120 performs further training 1155 of the one or more ML models 1125 by updating the one or more ML models 1125 to reinforce weights and/or connections within the one or more ML models 1125 that contributed to the generation of the optimal time period 1130, encouraging the one or more ML models 1125 to generate similar optimal time period determinations given similar inputs. If the optimal time period 1130 does not match the pre-determined optimal time period 1140 during validation 1175, then the ML engine 1120 performs further training 1155 of the one or more ML models 1125 by updating the one or more ML models 1125 to weaken, remove, and/or replace weights and/or connections within the one or more ML models that contributed to the generation of the optimal time period 1130, discouraging the one or more ML models 1125 from generating similar optimal time period determinations given similar inputs.

Validation 1175 and further training 1155 of the one or more ML models 1125 can continue once the one or more ML models 1125 are in use based on feedback 1150 received regarding the optimal time period 1130. In some examples, the feedback 1150 can be received from a user via a user interface, for instance via an input from the user interface that approves or declines use of the optimal time period 1130 for charging the ESU. In some examples, the feedback 1150 can be received from another component or subsystem of the vehicle (e.g., an energy control system), for instance based on whether the component or subsystem successfully uses the optimal time period 1130, whether use the optimal time period 1130 causes any problems for the component or subsystem (e.g., which may be detected using the sensors), whether use the optimal time period 1130 are accurate, or a combination thereof. If the feedback 1150 is positive (e.g., expresses, indicates, and/or suggests approval of the optimal time period 1130, success of the optimal time period 1130, and/or accuracy the optimal time period 1130), then the ML engine 1120 performs further training 1155 of the one or more ML models 1125 by updating the one or more ML models 1125 to reinforce weights and/or connections within the one or more ML models 1125 that contributed to the generation of the optimal time period 1130, encouraging the one or more ML models 1125 to generate similar optimal time period determinations given similar inputs. If the feedback 1150 is negative (e.g., expresses, indicates, and/or suggests disapproval of the optimal time period 1130, failure of the optimal time period 1130, and/or inaccuracy of the optimal time period 1130) then the ML engine 430 performs further training 1155 of the one or more ML models 1125 by updating the one or more ML models 1125 to weaken, remove, and/or replace weights and/or connections within the one or more ML models that contributed to the generation of the optimal time period 1130, discouraging the one or more ML models 1125 to generate similar optimal time period determinations given similar inputs.

Figure 12:
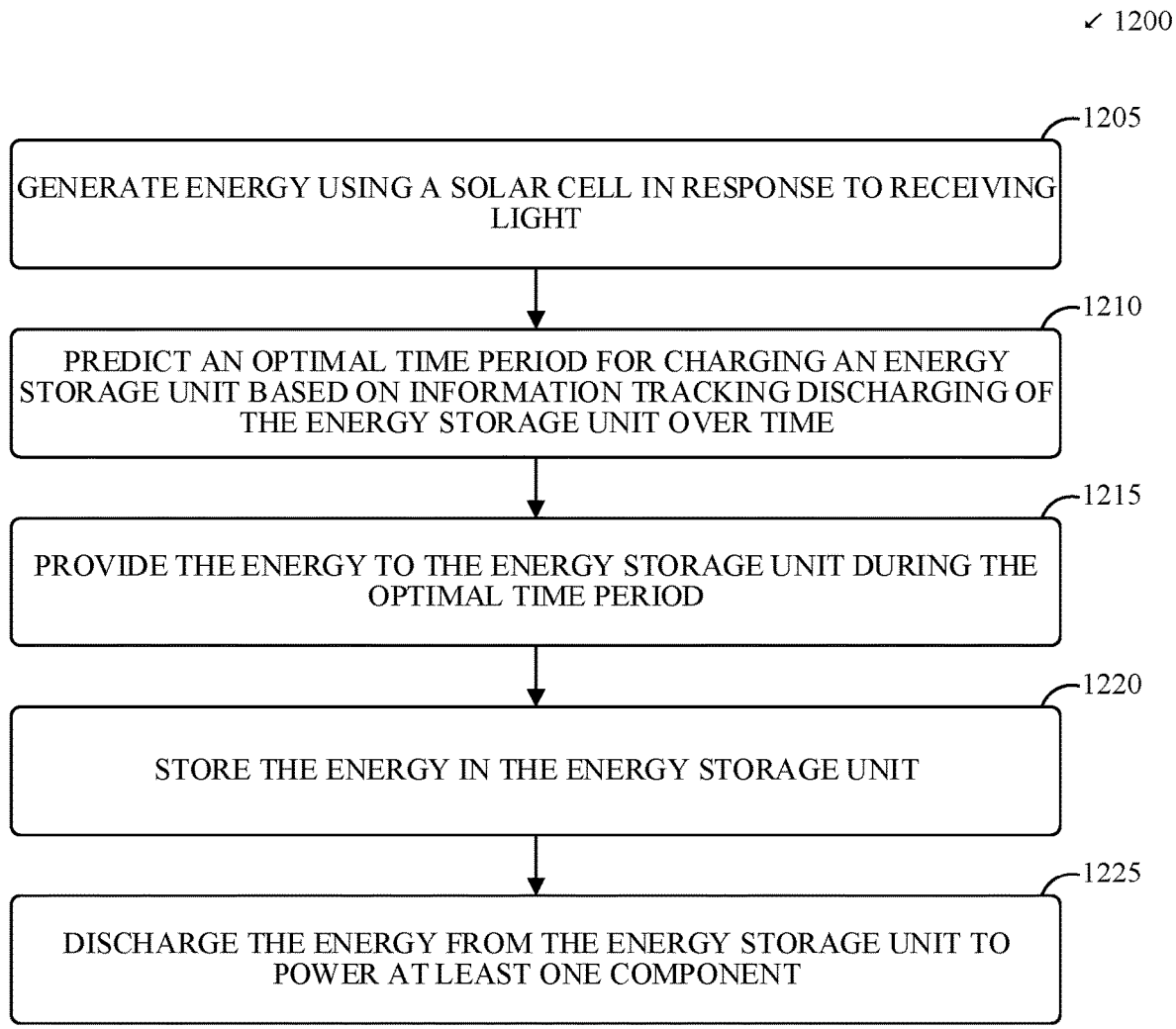
FIG. 12 is a flow diagram illustrating a process for energy management performed using a control system, according to some examples.

FIG. 12 is a flow diagram illustrating a process 1200 for energy management performed using a control system. The control system that performs the process 1200 can include the energy management system 100, the electric vehicle 102, energy management network and database 104, the cloud 106, the supercapacitor units 108 (and/or other ESUs such as batteries), the design database 120, the base module 122, the solar database 144, the solar module 148, any system(s) that perform any of the processes of any of FIGS. 2-10, the ML engine 1120 of FIG. 11, an apparatus, a non-transitory computer-readable storage medium coupled to a processor, component(s) or subsystem(s) of any of these systems, or a combination thereof.

At operation 1205, the control system is configured to, and can, generate energy using a solar cell (e.g., solar module 148, solar hardware controller 146) in response to receiving light.

At operation 1210, the control system is configured to, and can, predict an optimal time period for charging an energy storage unit (e.g., supercapacitor units 108 and/or batteries) based on information tracking discharging of the energy storage unit over time. The input data 1105 is an example of the information tracking discharging of the energy storage unit over time. In some examples, the information tracking discharging of the energy storage unit over time includes information tracking movement of the vehicle over time.

In some examples, the control system is configured to, and can, identify a route to be traversed by the vehicle using the propulsion mechanism, wherein the energy controller is configured to predict the optimal time period for charging the energy storage unit based also on the route. In some examples, the control system is configured to, and can, identify an uphill portion of the route, wherein the energy controller is configured to predict the optimal time period to avoid time while the vehicle is on the uphill portion of the route. For instance, the control system can encourage changing while the vehicle is on a downhill and/or flat portion of the route, and discourage charging while the vehicle is on the uphill portion, as this may negatively impact charging efficiency and/or efficiency of the vehicle's driving and/or acceleration and/or speed, which is important to prioritize while moving uphill.

In some examples, the control system is configured to, and can, identify a scheduled event to be reached by the vehicle using the propulsion mechanism, wherein the energy controller is configured to predict the optimal time period for charging the energy storage unit based also on a scheduled time associated with the scheduled event. For instance, the scheduled even can include a scheduled trip in the vehicle, or an event that the user will be attending by driving to the event using the vehicle. The control system can select the optimal time period for charging to charge the vehicles before and/or after the trip(s) to and/or from the scheduled event.

In some examples, the control system is configured to, and can, predict the optimal time period for charging the energy storage unit based also on information tracking charging of the energy storage unit over time.

In some examples, the control system includes a charge management database (e.g., design database 120 and/or solar database 144) that is configured to store data tracking the information tracking charging of the energy storage unit over time, data tracking the information tracking discharging of the energy storage unit over time, or a combination thereof.

In some examples, the control system is configured to, and can, input the information (e.g., input information 1105) tracking discharging of the energy storage unit over time into a trained machine learning model (e.g., the ML model(s) 1125) to predict the optimal time period for charging the energy storage unit. In some examples, the control system is configured to, and can, also input information (e.g., input information 1105) tracking the charging of the energy storage unit over time into the trained machine learning model to predict the optimal time period for charging the energy storage unit. In some examples, the control system is configured to, and can, use the predicted optimal time period for charging the energy storage unit as training data to update the trained machine learning model (e.g., as in the further training 1155 or the initial training 1165).

At operation 1215, the control system is configured to, and can, provide the energy to the energy storage unit during the optimal time period, for instance using trickle charging circuitry (e.g., trickle charger 162). At operation 1220, the control system is configured to, and can, store the energy in the energy storage unit (e.g., the supercapacitor units 108 and/or batteries).

At operation 1225, the control system is configured to, and can, discharge the energy from the energy storage unit to power at least one component. In some examples, the at least one component includes a propulsion mechanism of a vehicle. For instance, the control system may include the vehicle, and/or the vehicle may include the control system.

In some examples, the control system is configured to, and can, output an indication of the optimal time period using an output interface, such as the display interface 114 or an audio output interface (e.g., speaker(s) and/or headphone(s)).

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Aspects of the present disclosure may be provided as a computer program product, which may include a computer-readable medium tangibly embodying thereon instructions, which may be used to program a computer (or other electronic devices) to perform a process. The computer-readable medium may include, but is not limited to, fixed (hard) drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other types of media/machine-readable medium suitable for storing electronic instructions (e.g., computer programming code, such as software or firmware). Moreover, aspects of the present disclosure may also be downloaded as one or more computer program products, wherein the program may be transferred from a remote computer to a requesting computer by way of data signals embodied in a carrier wave or other propagation medium via a communication link (e.g., a modem or network connection).

What is claimed is:

1. A system for energy management, the system comprising:
   a solar cell that generates energy in response to the solar cell receiving light;
   an energy controller that that includes a processor with access to a memory, wherein the energy controller predicts an optimal time period for charging an energy storage unit based on discharge information tracking discharging of the energy storage unit over time and based on planned route of a vehicle, wherein the energy controller avoids a discharge time period to predict the optimal time period for charging the energy storage unit, wherein the discharge time period is associated with an anticipated discharge rate of the energy storage unit exceeding an average discharge rate associated with the vehicle;
   trickle charging circuitry that provides the energy to the energy storage unit during the optimal time period and avoids providing energy to the energy storage unit during the discharge time period; and
   the energy storage unit, wherein the energy storage unit stores the energy, wherein the energy storage unit discharges the energy to power at least one component, wherein the at least one component includes a propulsion mechanism of the vehicle.

2. The system of claim 1, wherein the discharge information tracking discharging of the energy storage unit over time includes movement information tracking movement of the vehicle over time.

3. The system of claim 1, wherein the planned route is associated with a scheduled trip.

4. The system of claim 1, wherein the discharge time period is associated with the vehicle driving along an uphill portion of the planned route.

5. The system of claim 4, wherein the energy controller identifies the uphill portion of the planned route.

6. The system of claim 1, wherein the energy controller identifies a scheduled event to be reached by the vehicle using the propulsion mechanism, wherein the scheduled event is associated with the planned route and a scheduled time, and wherein the energy controller predicts the optimal time period for charging the energy storage unit based on the discharge information, the planned route, and the scheduled time.

7. The system of claim 1, wherein the energy controller predicts the optimal time period for charging the energy storage unit based on the discharge information, the planned route, and charge information tracking charging of the energy storage unit over time.

8. The system of claim 7, further comprising:
   a charge management database that stores the charge information tracking charging of the energy storage unit over time.

9. The system of claim 1, further comprising:
   a charge management database that stores the discharge information tracking discharging of the energy storage unit over time.

10. The system of claim 1, wherein the energy controller processes the discharge information and the planned route using a trained machine learning model to predict the optimal time period for charging the energy storage unit.

11. The system of claim 1, wherein the energy controller processes the discharge information, the planned route, and charge information tracking the charging of the energy storage unit over time using a trained machine learning model to predict the optimal time period for charging the energy storage unit.

12. The system of claim 10, wherein the energy controller updates the trained machine learning model based on training data, wherein the training data includes the optimal time period for charging the energy storage unit.

13. The system of claim 1, wherein the discharge time period is associated with the vehicle accelerating along the planned route.

14. A method for energy management, the method comprising:
   generating energy using a solar cell in response to the solar cell receiving light;
   predicting an optimal time period for charging an energy storage unit based on discharge information tracking discharging of the energy storage unit over time and based on planned route of a vehicle, wherein predicting the optimal time period for charging the energy storage unit includes avoiding a discharge time period, wherein the discharge time period is associated with an anticipated discharge rate of the energy storage unit exceeding an average discharge rate associated with the vehicle;
   providing the energy to the energy storage unit during the optimal time period and avoiding provision of energy to the energy storage unit during the discharge time period;
   storing the energy in the energy storage unit; and
   discharging the energy from the energy storage unit to power at least one component, wherein the at least one component includes a propulsion mechanism of the vehicle.

15. The method of claim 14, wherein the discharge information tracking discharging of the energy storage unit over time includes movement information tracking movement of the vehicle over time.

16. The method of claim 14, wherein the planned route is associated with a scheduled trip.

17. The method of claim 14, wherein predicting the optimal time period for charging the energy storage unit is based on the discharge information, the planned route, and charge information tracking charging of the energy storage unit over time.

18. The method of claim 14, wherein predicting the optimal time period for charging the energy storage unit includes processing the discharge information and the planned route using a trained machine learning model to predict the optimal time period for charging the energy storage unit.

19. The method of claim 18, further comprising:
updating the trained machine learning model based on training data, wherein the training data includes the optimal time period for charging the energy storage unit.

20. A non-transitory computer readable storage medium having embodied thereon a program, wherein the program is executable by a processor to perform a method of energy management, the method comprising:
generating energy using a solar cell in response to the solar cell receiving light;
predicting an optimal time period for charging an energy storage unit based on discharge information tracking discharging of the energy storage unit over time and based on planned route of a vehicle, wherein predicting the optimal time period for charging the energy storage unit includes avoiding a discharge time period, wherein the discharge time period is associated with an anticipated discharge rate of the energy storage unit exceeding an average discharge rate associated with the vehicle;
providing the energy to the energy storage unit during the optimal time period and avoiding provision of energy to the energy storage unit during the discharge time period;
storing the energy in the energy storage unit; and
discharging the energy from the energy storage unit to power at least one component, wherein the at least one component includes a propulsion mechanism of the vehicle.

* * * * *